United States Patent
Jeong et al.

(10) Patent No.: US 7,773,994 B2
(45) Date of Patent: Aug. 10, 2010

(54) METHOD AND APPARATUS FOR UPLINK DATA TRANSMISSION IN HANDOVER AREA USING TRANSPORT CHANNELS FOR UPLINK SERVICE

(75) Inventors: Kyeong-In Jeong, Suwon-si (KR); Gert Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 11/201,273

(22) Filed: Aug. 11, 2005

(65) Prior Publication Data

US 2006/0039326 A1      Feb. 23, 2006

(30) Foreign Application Priority Data

Aug. 12, 2004   (KR) ............... 10-2004-0063393

(51) Int. Cl.
  *H04W 36/00* (2009.01)
(52) U.S. Cl. ............ 455/442; 455/452.1; 370/331
(58) Field of Classification Search ........... 370/436, 370/331; 455/451, 435.1, 432.1, 436; 3/436, 3/331

See application file for complete search history.

(56) References Cited

U.S. PATENT DOCUMENTS

| | | | | |
|---|---|---|---|---|
| 6,466,556 | B1 * | 10/2002 | Boudreaux | 370/331 |
| 6,507,567 | B1 * | 1/2003 | Willars | 370/321 |
| 6,608,832 | B2 * | 8/2003 | Forslow | 370/353 |
| 6,889,050 | B1 * | 5/2005 | Willars et al. | 455/452.2 |
| 2004/0228315 | A1 * | 11/2004 | Malkamaki | 370/342 |
| 2005/0025100 | A1 * | 2/2005 | Lee et al. | 370/335 |
| 2005/0094586 | A1 | 5/2005 | Zhang et al. | |
| 2005/0157680 | A1 | 7/2005 | Zhang et al. | |

FOREIGN PATENT DOCUMENTS

| | | |
|---|---|---|
| KR | 2004/0074015 | 8/2004 |
| WO | WO 01/89241 | 11/2001 |
| WO | WO 02/067594 | 8/2002 |

OTHER PUBLICATIONS

Ingo Forkel, Marc Schinnenburg, Bianca Wouters, Performance Evaluation of Soft Handover in a Realistic UMTS Network, Apr. 22, 2003, IEEE.*

* cited by examiner

*Primary Examiner*—Nick Corsaro
*Assistant Examiner*—Vladimir Magloire
(74) *Attorney, Agent, or Firm*—Roylance, Abrams, Berdo & Goodman, L.L.P.

(57) ABSTRACT

A method and an apparatus for uplink data transmission using an enhanced uplink dedicated channel (E-DCH) in a mobile telecommunication system which employs a code division multiple access (CDMA) scheme are provided. User equipment (UE) located in a handover area related to a cell supporting the E-DCH and a cell not supporting the E-DCH configures a radio bearer including the E-DCH and a radio bearer including an uplink dedicated channel (DCH) such that they are mapped to one uplink logical channel, and transmits uplink data through any one radio bearer selected by the UE or a serving radio network controller (SRNC). Thus, a delay time due to radio bearer reconfigurations and signaling overhead for the radio bearer reconfigurations are reduced.

24 Claims, 13 Drawing Sheets

METHOD AND APPARATUS FOR UPLINK DATA TRANSMISSION IN HANDOVER AREA USING TRANSPORT CHANNELS FOR UPLINK SERVICE

CROSS-REFERENCE TO RELATED APPLICATION

This application claims benefit under 35 U.S.C. §119 from a Korean Patent Application Serial No. 2004-63393 filed in the Korean Industrial Property Office on Aug. 12, 2004, the entire contents of which are hereby incorporated by reference.

BACKGROUND OF THE INVENTION

1. Field of the Invention

The present invention relates to a Wideband Code Division Multiple Access (herein after referred to as 'WCDMA') communication system. More particularly, the present invention relates to a method and an apparatus for selectively using an Enhanced Uplink Dedicated Channel (hereinafter referred to as 'EUDCH' or 'E-DCH') or an Uplink Dedicated Channel (hereinafter referred to as 'DCH') as a transmission path for uplink data transmission when a User Equipment (hereinafter referred to as 'UE') passes through a network which includes cells supporting the E-DCH and cells not supporting the E-DCH.

2. Description of the Related Art

Universal Mobile Telecommunication Service (hereinafter referred to as 'UMTS') is a $3^{rd}$ generation mobile communication system based upon European mobile communication systems. That is, UMTS is a system based upon Global System for Mobile Communications (GSM) and General Packet Radio Services (GPRS) employing a WCDMA scheme. UMTS provides uniform services which enables cellular phone or computer users to transmit packet-based text, digitized voice or video and multimedia data at a speed higher than 2 Mbps no matter where in the world they are located.

FIG. 1 illustrates a structural view of a typical UMTS Terrestrial Radio Access Network (hereinafter referred to as 'UTRAN').

Referring to FIG. 1, the UTRAN 111 consisting of Radio Network Controllers (hereinafter referred to as 'RNC') 131, 132 and Node Bs 141, 142, 143, 144 connects a UE 151 to a Core Network (hereinafter referred to as 'CN') 101. Node Bs 141 to 144 may include a plurality of subordinate cells, and each RNC 131, 132 controls Node Bs under its control and each Node B also controls cells under its control. Each RNC 131, 132, Node Bs under the control of each RNC 131, 132, and the cells under the controls of the Node Bs constitute a Radio Network Subsystem (hereinafter referred to as 'RNS') 121, 122.

The RNCs 131, 132 assign or manage radio resources of the Node Bs 141 to 144 under their control, and the Node Bs 141 to 144 functions to actually provide the radio resources. The radio resources are configured cell by cell, and the radio resources provided by the Node Bs 141 to 144 signify the radio resources of the cells under their control. The UE 151 configures a radio channel and carries out communication using the radio resource which is provided by a specific cell of a specific Node B. As for the UE 151, the discrimination between the Node B and the cell is meaningless because it recognizes only physical channels configured cell by cell. Thus, the Node B and the cell will be henceforth referred to as terms having the same meaning.

An interface between the IE and the RNC is called a Uu interface, and FIG. 2 shows a layered architecture of the Uu interface in detail. The Uu interface is divided into a Control Plane (hereinafter referred to as 'C-Plane') 201 and a User Plane (hereinafter referred to as 'U-Plane') 202. The C-Plane 201 is used for exchanging control signals between the UE 201 and the RNC, and the U-Plane 202 is used for actually transmitting user data.

A Radio Resource Control (hereinafter referred to as 'RRC') layer 211, a Radio Link Control (hereinafter referred to as 'RLC') layer 241, a Media Access Control (hereinafter referred to as "MAC") layer 271 and a physical layer 291 exist in the C-Plane 201, and a Packet Data Convergence Protocol (hereinafter referred to as 'PDCP') layer 221, a Broadcast Management Control (hereinafter referred to as 'BMC') layer 231, the RLC layer 241, the MAC layer 271 and the physical layer 291 exist in the U-Plane 202.

The Physical Layer 291 corresponds to Layer 1 of Open System Interworking (OSI) Model 7, and converts data to be transmitted into a radio signal or converts a radio signal into data to be received by performing channel coding/decoding, modulation/demodulation, channelisation/dechannelisation and other functions. The physical layer 291 is connected to the MAC layer 271 by a transport channel 281. The transport channel 281 is classified according to parameters such as a channel coding scheme, a transport block set size transmittable in a unit time and the like. For example, uplink dedicated channels includes a DCH and an E-DCH. The DCH signifies an Uplink Dedicated Channel and the E-DCH signifies an Enhanced Uplink Dedicated Channel.

The MAC layer 271 functions to transmit data, which the RLC layer 241 has transmitted thereto over a logical channel 261, to the physical layer 291 over an appropriate transport channel 281 and transmit data, which the physical layer 291 has transmitted thereto over a transport channel 281, to the RLC layer 241 over an appropriate logical channel 261. The MAC layer 271 may also function to insert additional information into dada transmitted over the logical channel 261 or the transport channel 281, or analyze the inserted additional information to operate appropriately. The MAC layer 271 also controls a random access operation.

The RLC layer 241 takes charge of setup and release of the logical channel 261. Entities 251, 252, 253, 254 of the RLC layer 241 may operate in one operation mode from among an Acknowledged Mode (hereinafter referred to as 'AM'), an Unacknowledged Mode (hereinafter referred to as 'UM') and a Transparent Mode (hereinafter referred to as 'TM'). There are differences in functions provided according to the respective modes. In general, the RLC layer 241 supervises a function of dividing or assembling a Service Data Unit (SDU), which comes down from an upper layer, into an appropriate size, a function of error correction through an Automatic Repeat Request, and the like.

The PDCP layer 221 is located in a superior position to the RLC layer 241 in the U-Plane, and takes charge of a header compression function of data transmitted in the form of an IP packet, a lossless data transmission function under the condition where the RNC providing services to the UE is changed due to the mobility of the UE, and so forth. The BMC layer 231 is also located in a superior position to the RLC layer 241 in the U-Plane, and supports a broadcasting service in which the same data are transmitted to unspecified plural UEs in a specific cell.

The RRC layer 211 takes charge of assignment and release of radio resources between the UTRAN and the UE. Using RRC connections, the RNC manages the radio resources assigned to the UEs, which are in an RRC connected mode, controls the mobility of the UEs, and transmits CN signals, which must be transmitted to the UEs, to the corresponding UEs. The RNC also manages the RRC connections of the UEs located in the Node B areas under its control.

The E-DCH refers to an uplink dedicated channel which has been developed so as to enhance transmission performance in reverse communication, that is, uplink communication from UEs to Node Bs in the UMTS system. For supporting more stable high-speed transmission, the E-DCH supports various technologies such as Adapted Modulation and Coding (hereinafter referred to as 'AMC'), Hybrid Automatic Retransmission Request (hereinafter referred to as 'HARQ'), Node B-controlled scheduling, shorter Transmission Time Interval (hereinafter referred to as 'TTI') size and the like.

The AMC is a technology for improving use efficiency of resources by determining modulation and coding schemes dependent on channel conditions between a Node B and a UE. A combination of modulation and coding schemes is called a Modulation and Coding Scheme (hereinafter referred to as 'MCS'). It is possible to define various MCS levels according to supportable modulation and coding schemes. The AMC adaptively determines the levels of the MCS dependent on the channel conditions between the Node B and the UE to improve the use efficiency of resources.

The HARQ signifies a technology for retransmitting data packets so as to compensate errors occurring in initially transmitted data packets. The HARQ may be classified into a Chase Combining (hereinafter referred to as 'CC') technique for retransmitting data packets having the same formats as those of the initially transmitted data packets when the errors occur and an Incremental Redundancy (hereinafter referred to as 'IR') technique for retransmitting data packets having different formats than those of the initially transmitted data packets when the errors occur.

The Node B-controlled scheduling signifies a transmission scheme in which if the Node B determines whether or not uplink data is transmitted, an upper limit value of possible data rates and so forth to transmit the determined information as a scheduling command to the UE when the data is transmitted using the E-DCH, the UE determines a possible data transmission rate of the uplink E-DCH with reference to the scheduling command to transmit the data at the determined data transmission rate.

The shorter TTI size permits a TTI of 2 ms shorter than the minimal TTI of the existing GSM/GPRS system, that is, 10 ms, thereby reducing retransmission delay time and thus enabling high system throughput.

FIG. 3 is a view for explaining uplink transmission over the E-DCH in a radio link.

Reference numeral 310 designates a base station supporting the E-DCH, that is, a Node B, and reference numerals 301, 302, 303 and 304 designate UEs using the E-DCH. As shown in the drawing, the UEs 301 to 304 individually transmit data to the Node B 310 over the E-DCH. The Node B 310 utilizes data buffer statuses, requested data transmission rates, or channel condition information of the UEs 301 to 304 using the E-DCH, to inform the possibility of data transmission over the E-DCH, or to perform a scheduling operation for adjusting an E-DCH data transmission rate UE by UE.

In order to improve the overall system performance, the scheduling is performed in such a manner that lower data transmission rates are assigned to the UEs 303, 304 remote from the Node B 310 and higher data transmission rates are assigned to the UEs 301, 302 adjacent to the Node B 310 while a Noise Rise or Rise over Thermal (ROT) value dose not exceeds a target value.

The E-DCH may be supported by Node Bs supporting 3GPP ($3^{rd}$ Generation partnership Project) Release Apr. 5, 1999 and cannot be supported by the existing Node Bs, for example, Node Bs supporting only 3GPP Release 6. Therefore, in an environment where all of cells cannot support enhanced 3GPP standards, for example, in a network which includes cells supporting the E-DCH and cells not supporting the E-DCH, a new technology is desired to enables a UE moving among the cells to selectively use the E-DCH or the DCH as a transmission path for uplink data transmission.

SUMMARY OF THE INVENTION

Exemplary embodiments of the present invention address at least the above-mentioned problems occurring in the prior art, and an object of certain exemplary embodiments of the present invention is to provide a method and an apparatus for enabling a UE, which moves between cells supporting an E-DCH and cells not supporting the E-DCH, to efficiently transmit uplink data.

In order to accomplish this object, in accordance with one aspect of the present invention, there is provided a method for transmitting uplink data by a UE in a mobile telecommunication system which supports first and second dedicated transmission channels for an uplink service, the second dedicated transmission channel being enhanced in comparison with the first dedicated transmission channel, the method comprising configuring a first radio bearer including the first dedicated transmission channel and a second radio bearer including the second dedicated transmission channel for the uplink service to be transmitted, deciding if at least one cell supporting the second dedicated transmission channel exists from among plural cells included in an active set of the UE, transmitting the uplink data through the first radio bearer including the first dedicated transmission channel if all the plural cells do not support the second dedicated transmission channel, and transmitting the uplink data through the second radio bearer including the second dedicated transmission channel if at least one cell supporting the second dedicated transmission channel exists.

In accordance with another aspect of the present invention, there is provided a method for transmitting uplink data by a UE in a mobile telecommunication system which supports first and second dedicated transmission channels for an uplink service, the second dedicated transmission channel being enhanced in comparison with the first dedicated transmission channel, the method comprising receiving target transmission channel information indicating the first dedicated transmission channel or the second dedicated transmission channel from a Serving Radio Network Controller (SRNC) for controlling radio resources of the UE, configuring a first radio bearer including the first dedicated transmission channel and a second radio bearer including the second dedicated transmission channel for the uplink service to be transmitted, transmitting the uplink data through the first radio bearer including the first dedicated transmission channel when the target transmission channel information indicates the first dedicated transmission channel, and transmitting the uplink data through the second radio bearer including the second dedicated transmission channel when the target transmission channel indicates the second dedicated transmission channel.

In accordance with another aspect of the present invention, there is provided a UE apparatus for transmitting uplink data in a mobile telecommunication system which supports first and second dedicated transmission channels for an uplink service, the second dedicated transmission channel being enhanced in comparison with the first dedicated transmission channel, the apparatus comprising an SRNC for controlling radio resources of the UE; an RRC signaling transmitter/receiver unit for transmitting/receiving signaling messages, a data transmission control unit for communicating with the RRC signaling transmitter/receiver unit to store an uplink transport channel type indicating that a logical channel related to the uplink service to be transmitted is mapped to the first and second dedicated transmission channels and channel configuration information for a first radio bearer including the first dedicated transmission channel and a second radio bearer including the second dedicated transmission channel, and select the first radio bearer or the second radio bearer for the uplink service, and an uplink data transmitter unit for configuring the first radio bearer including the logical channel, the first dedicated transmission channel and a first physical channel to which the first dedicated transmission channel is mapped and the second radio bearer including the logical channel, the second dedicated transmission channel and a second physical channel to which the second dedicated transmission channel is mapped, and transmitting the uplink data through the first or second radio bearer selected by the data transmission control unit.

In accordance with another aspect of the present invention, there is provided a method for receiving uplink data from a UE in a radio network controller of a mobile telecommunication system which uses first and second dedicated transmission channels for an uplink service and at least one cell of which supports the second dedicated transmission channel, the second dedicated transmission channel being enhanced in comparison with the first dedicated transmission channel, the method comprising setting up first channel configuration information for a first radio bearer including the first dedicated transmission channel and second channel configuration information for a second radio bearer including the second dedicated transmission channel according to the requested uplink service, carrying the first and second channel configuration information in a radio bearer setup message and transmitting them to the UE, and receiving the uplink data from the UE through the first or second radio bearer selected according to an active set change due to the movement of the UE.

In accordance with another aspect of the present invention, there is provided a method for receiving uplink data from a UE in a radio network controller of a mobile telecommunication system which uses first and second dedicated transmission channels for an uplink service and at least one cell of which supports the second dedicated transmission channel, the second dedicated transmission channel being enhanced in comparison with the first dedicated transmission channel, the method comprising setting up first channel configuration information for a first radio bearer including the first dedicated transmission channel and second channel configuration information for a second radio bearer including the second dedicated transmission channel according to the requested uplink service, carrying the first channel configuration information, the second channel configuration information and target transmission channel information indicating the first or second dedicated transmission channel in a radio bearer setup message and transmitting them to the UE; and receiving the uplink data from the UE through the first or second radio bearer selected according to the target transmission channel information.

In accordance with another aspect of the present invention, there is provided a radio network controller apparatus for receiving uplink data from a UE in a mobile telecommunication system which uses first and second dedicated transmission channels for an uplink service and at least one cell of which supports the second dedicated transmission channel, the second dedicated transmission channel being enhanced in comparison with the first dedicated transmission channel, the apparatus comprising a radio bearer setup control unit for setting up an uplink transport channel type indicating that a logical channel related to the requested uplink service is mapped to the first and second dedicated transmission channels, first channel configuration information for a first radio bearer including the first dedicated transmission channel and second channel configuration information for a second radio bearer including the second dedicated transmission channel, an RRC signaling transmitter/receiver unit for transmitting a radio bearer setup message including the uplink transport channel type and the first and second channel configuration information to the UE, and an uplink data receiver unit for receiving the uplink data from the UE through the first or second radio bearer selected according to a cell in which the UE is located after the UE sets up the first and second radio bearers based on the uplink transport channel type and the first and second channel configuration information.

BRIEF DESCRIPTION OF THE DRAWINGS

The above and other objects, features and advantages of exemplary embodiments of the present invention will be more apparent from the following detailed description of the exemplary embodiments taken in conjunction with the accompanying drawings, in which like reference symbols indicate the same or similar components, wherein.

DETAILED DESCRIPTION OF EXEMPLARY EMBODIMENT

Figure 1:
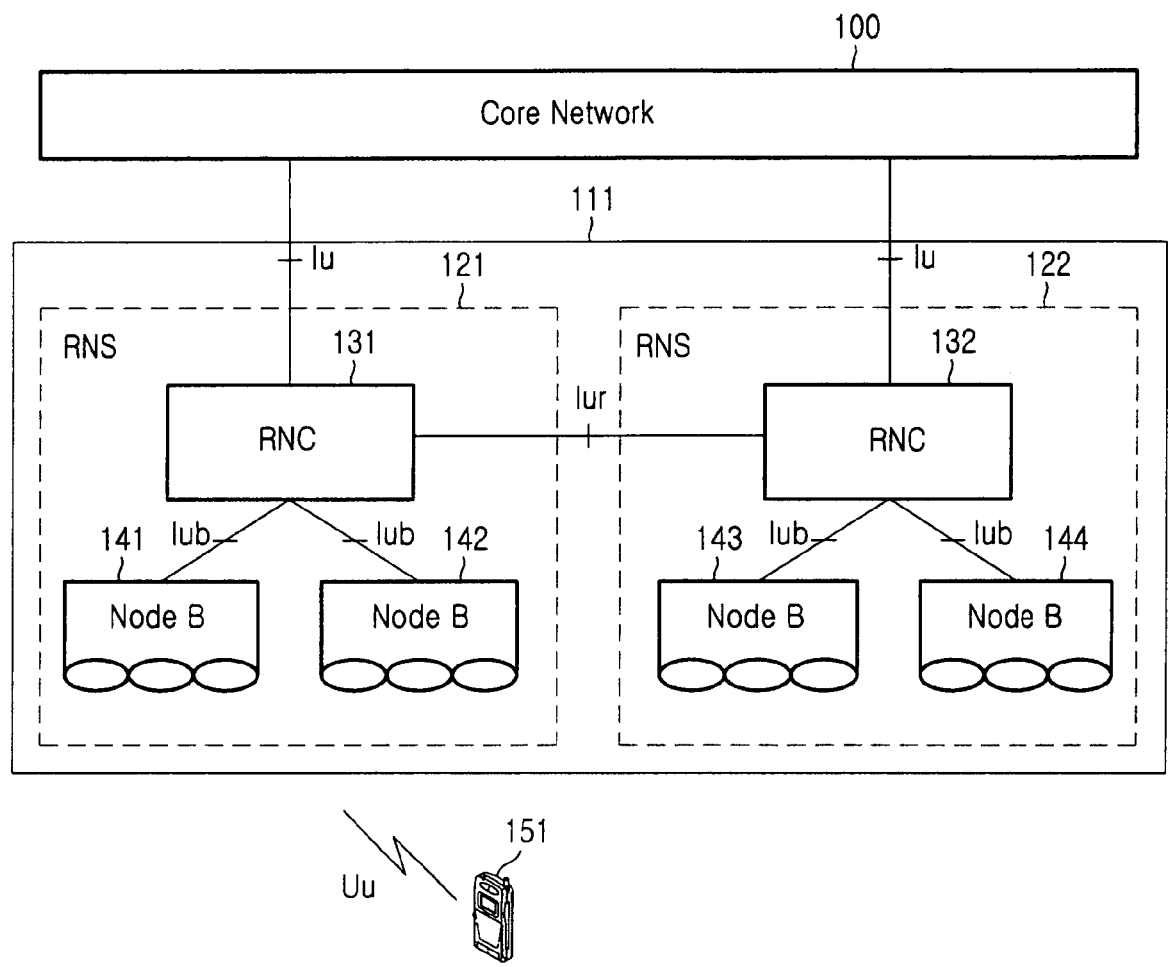
FIG. 1 is a structural view of a radio access network in a typical UMTS system.
Figure 2:
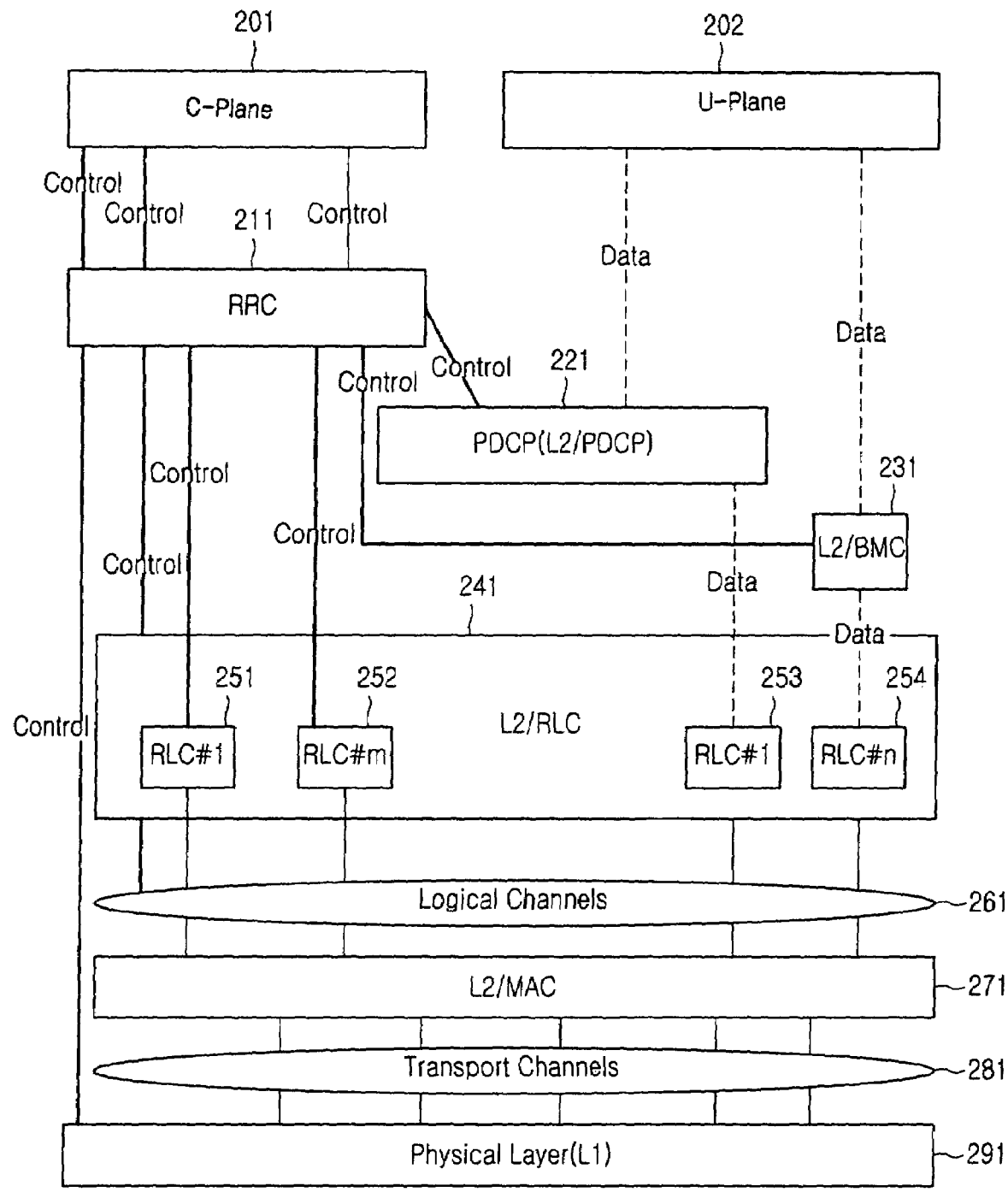
FIG. 2 is a schematic view showing a Uu interface protocol in a typical UTRAN.
Figure 3:
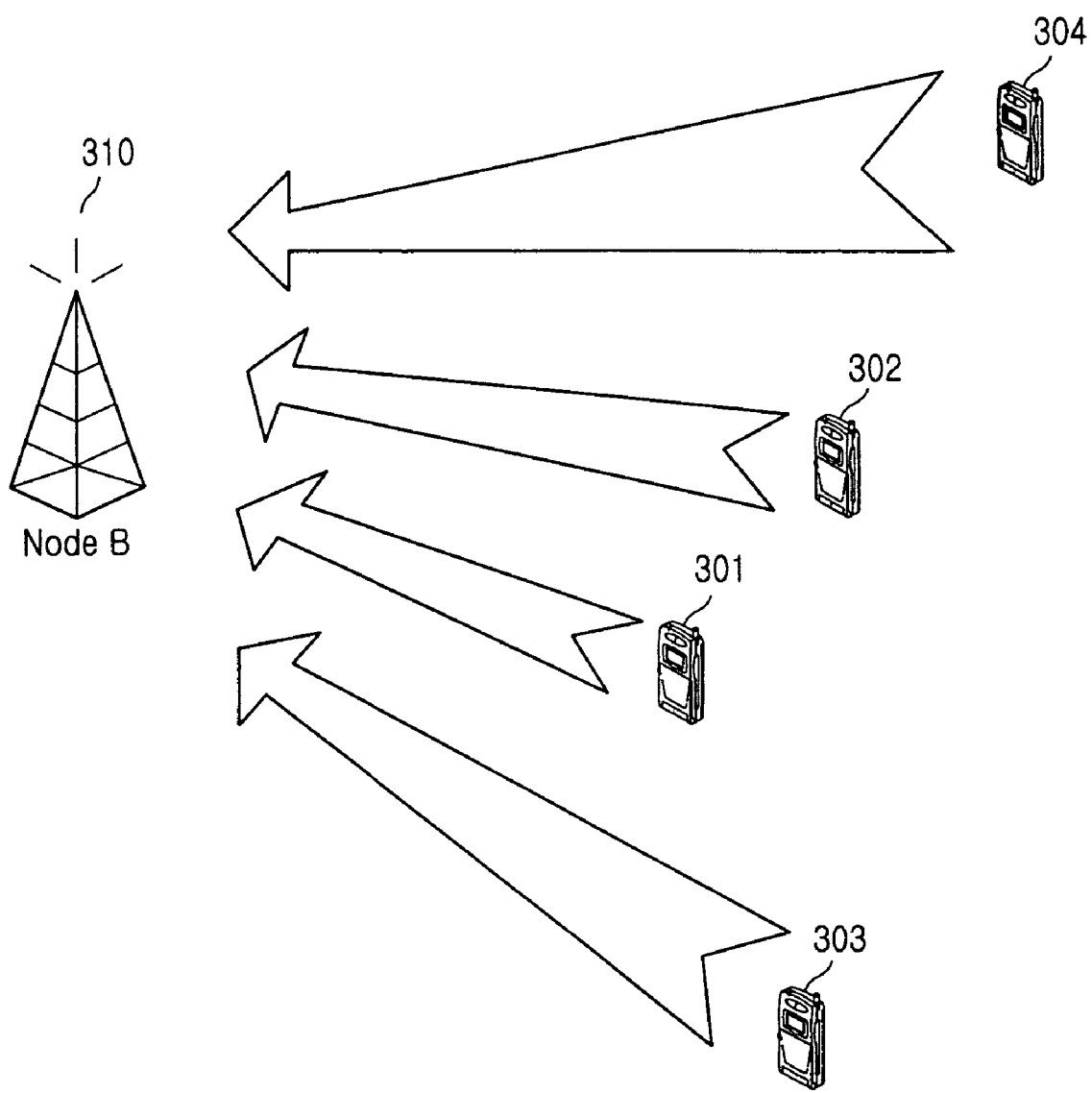
FIG. 3 is a schematic view for explaining general operations of a typical E-DCH.

Hereinafter, certain exemplary embodiments of the present invention will be described with reference to the accompanying drawings. As noted above, similar components are designated by similar reference numerals throughout the drawings.

Also, in the following description, a detailed description of known functions and configurations incorporated herein is omitted for conciseness.

Figure 4:
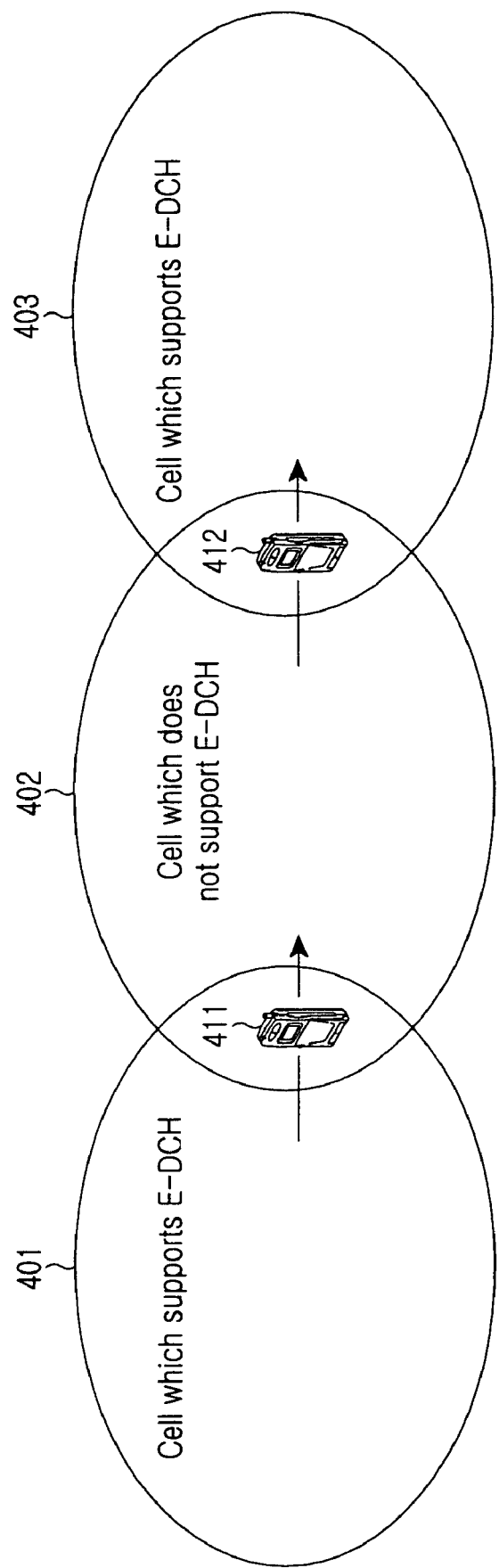
FIG. 4 is a schematic view showing movements of an E-DCH UE on a network consisting of cells supporting an E-DCH and cells not supporting the E-DCH.

FIG. 4 shows an E-DCH UE which moves in a network which includes cells supporting an E-DCH and cells not supporting the E-DCH. Reference numerals 401 and 403 designate the cells supporting the E-DCH (e.g., cells under the control of a Node B pursuant to the 3GPP Release 6 standard), and reference numeral 402 designates the cell not supporting the E-DCH (e.g., a cell under the control of a 3GPP R Apr. 5, 1999 Node B). The UE supporting the E-DCH (hereinafter referred to as 'E-DCH UE') 411 moves from the cell 401 to the cell 402, and the E-DCH UE 412 also moves from the cell 402 to the cell 403.

Thus, in a scenario as shown in FIG. 4, there are required operations for determining points of time when the UEs 411, 412 perform uplink transmission using the E-DCH or a DCH while they move between the cells, for determining a method for performing handover processing for the UEs by means of an RNC, and the like.

Figure 5:
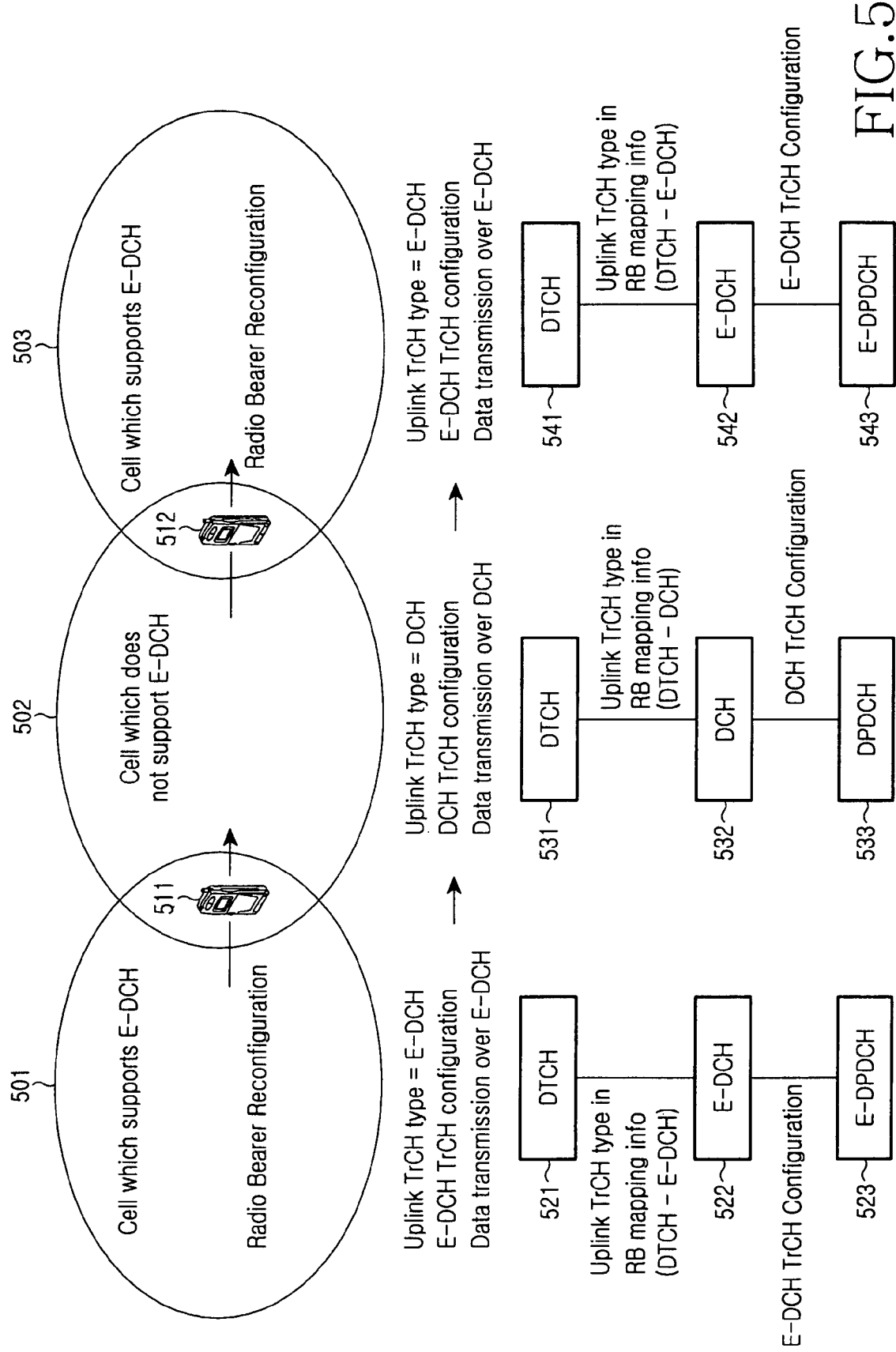
FIG. 5 is a schematic view showing radio bearers for transmitting uplink data in a network consisting of cells supporting an E-DCH and cells not supporting the E-DCH in accordance with an exemplary embodiment of the present invention.

FIG. 5 shows reconfigurations of radio bearers for uplink transmission in cells supporting the E-DCH and cells not supporting the E-DCH in accordance with a first preferred embodiment of the present invention.

Reference numerals 501 and 503 designate cells #1 and #3 supporting the E-DCH, and reference numeral 502 designates cell #2 not supporting the E-DCH. E-DCH UE #1 511 moves from cell #1 501 to cell #2 502, and E-DCH UE #2 512 moves from cell #2 502 to cell #3 503. In the following description, it is assumed that all the cells 501, 502, 503 have the same frequency band, but there is no significant difference in main operations of the exemplary embodiments of the present invention even when the cells have different frequency bands from each other.

If E-DCH UE #1 511 sets up a radio bearer in cell #1 501, a radio bearer including the E-DCH may be set up according to a service requested by E-DCH UE #1 511 because cell #1 501 supports the E-DCH. Thus, E-DCH UE #1 511 receives a radio bearer setup message transmitted from a Serving RNC (SRNC) in cell #1 501. The radio bearer setup message includes uplink radio bearer mapping information, and an uplink transport channel type, mapping information between a logical channel and a transport channel included in the uplink radio bearer mapping information, is set as 'E-DCH'. Also, E-DCH transport channel configuration information and configuration information for a Dedicated Physical Data Channel for E-DCH (hereinafter referred to as 'E-DPDCH') to which the E-DCH transport channel is mapped are transmitted to E-DCH UE #1 511 through the radio bearer setup message.

E-DCH UE #1 511 performs uplink data transmission over the logical channel—the E-DCH transport channel—the E-DPDCH physical channel while it resides in cell #1 501. That is, the radio bearer, including the logical channel, the transport channel and the physical channel which E-DCH UE #1 511 uses for uplink data transmission, consists of DTCH 521—E-DCH 522—E-DPDCH 523, and a set of those channels will be hereinafter referred to as 'an E-DCH radio bearer'.

If E-DCH UE #1 511 moves from cell #1 501 to cell #2 502, an active set update procedure for adding or deleting a radio link for cell #2 501 to or from the E-DCH UE #1 511 occurs. In this case, E-DCH UE #1 511 enters into a handover area between cell #1 501 and cell #2 502, so the radio link for cell #2 502 is added by the active set update procedure. Since cell #2 502 does not support the E-DCH, E-DCH UE #1 511 performs first reconfiguration for the E-DCH radio bearer having been used in cell #1 501 to reconfigure the E-DCH to the DCH, and then also adds the radio link for cell #2 502.

The reconfiguration of the E-DCH radio bearer is informed to E-DCH UE #1 511 through a radio bearer reconfiguration message received from the SRNC, and the radio link for cell #2 502 is added through the radio bearer update procedure. The radio bearer reconfiguration message includes uplink radio bearer mapping information, and an uplink transport channel type included in the uplink radio bearer mapping information is set as 'DCH'. Also, DCH transport channel information and configuration information for a DPDCH physical channel to which the DCH transport channel is mapped are transmitted to E-DCH UE #1 511. By such configuration information, E-DCH UE #1 511 comes to have a DCH radio bearer consisting of DTCH 531—DCH 532—DPDCH 533 in an uplink.

E-DCH UE #2 512 moves from cell #2 502 to cell #3 503. E-DCH UE #2 512 existing a handover area between cell #2 502 and cell #3 503 performs uplink transmission through the DCH radio bearer in cell # 2 502, and performs the active set update procedure only to add a radio link for cell # 3 503 without performing radio bearer reconfiguration so long as radio resources of a target cell are sufficient to admit the DCH radio bearer.

If E-DCH UE #2 512 moves out of the handover area between cell #2 502 and cell #3 503 and enters far into cell #3 503, the radio link connected to cell #2 502 is deleted and radio bearer reconfiguration for using the E-DCH of cell #3 503 occurs. E-DCH UE #2 512 receives an uplink transport channel type included in radio bearer mapping information through a radio bearer reconfiguration message received from the SRNC to set the E-DCH, and also receives E-DCH transport channel configuration information and E-DPDCH physical channel configuration information to perform uplink transmission through an E-DCH radio bearer of cell #3 503, which consists of DTCH 541—E-DCH 542—E-DPDCH 543.

In FIG. 5, an operation is shown in which the DCH radio bearer having been used in cell #2 502 is added intact in cell #3 503 when E-DCH UE #2 512 moves from cell #2 502 to cell #3 503, and then the radio bearer is so reconfigured as to include the E-DCH if cell #2 502 is deleted from the active set of E-DCH UE #2 512. In another embodiment, the radio bearer may be so reconfigured as to include the E-DCH by reusing the DCH radio bearer of cell #2 502 when cell #3 503 is added through the active set update.

Figure 6:
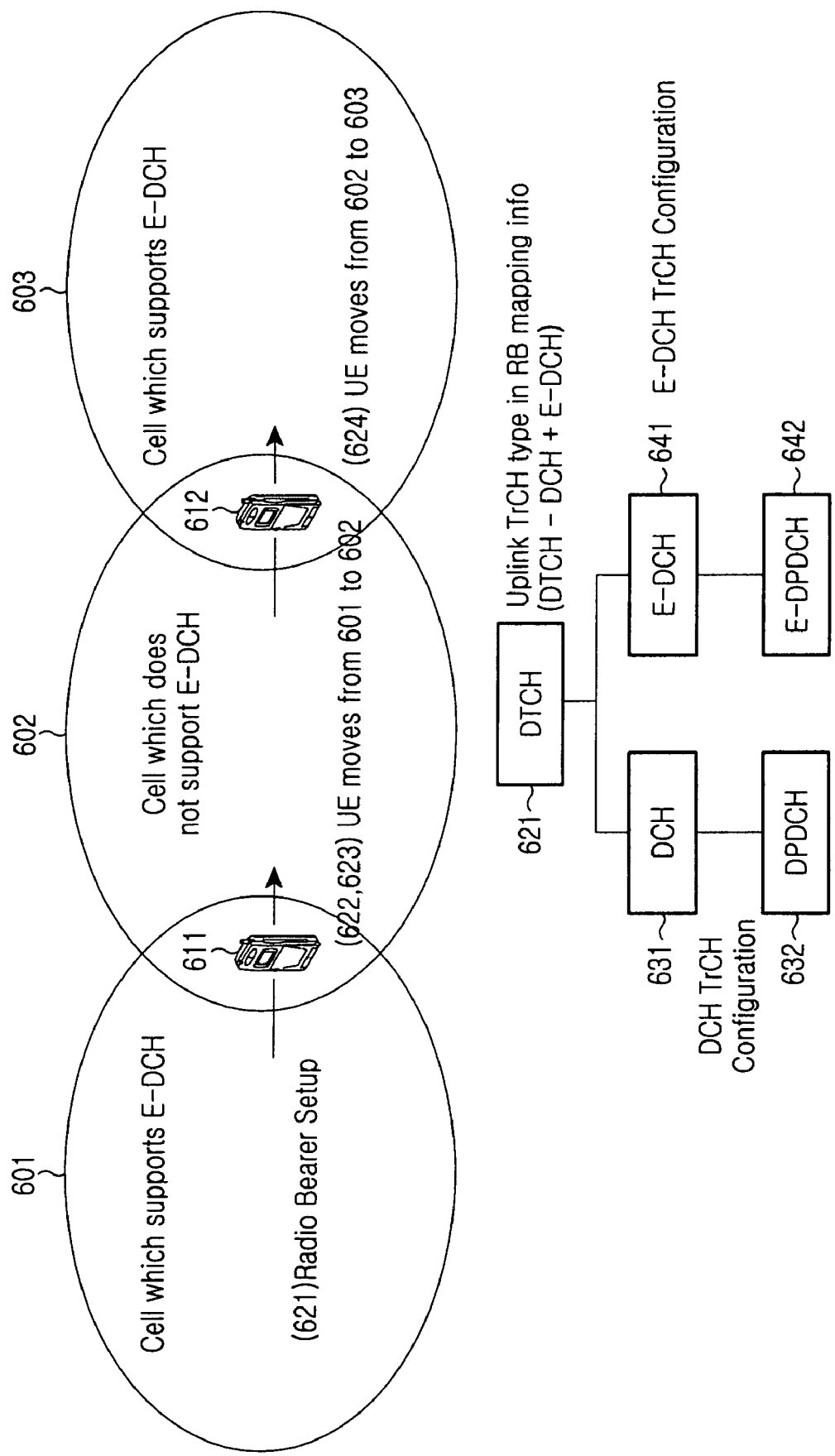
FIG. 6 is a schematic view showing an uplink transmission operation of an E-DCH UE in an handover area, which is proposed in accordance with an exemplary embodiment of the present invention.

FIG. 6 shows an uplink transmission operation of an E-DCH UE in a handover area in accordance with an exemplary embodiment of the present invention.

Reference numeral 601 and 603 designate cells #1 and #2 supporting an E-DCH, and reference numeral 602 designates cell #2 not supporting the E-DCH. E-DCH UE #1 611 moves from cell #1 601 to cell #2 602, and E-DCH UE #2 612 moves cell #2 602 to cell #3 603. It is assumed that all the cells 601, 602 603 have the same frequency band.

If E-DCH UE #1 611 sets up a radio bearer in cell #1 601, an E-DCH radio bearer as well as a DCH radio bearer for the uplink transmission of E-DCH UE #1 611 may be set up because cell #1 601 supports the E-DCH. Thus, the RNC sets up the DCH radio bearer and the E-DCH radio bearer together for E-DCH UE #1 611 according to a service requested by E-DCH UE #1 611 (process 621). Consequently, E-DCH UE #1 611 receives an E-DCH radio bearer setup message from the RNC in cell #1 601. The radio bearer setup message includes uplink radio bearer mapping information, and an uplink transport channel type included on the uplink radio bearer mapping information is set as 'DCH+E-DCH'. Such uplink transport channel type means that a logical channel related to the uplink service is mapped to all of the DCH and the E-DCH. Also, DCH transport channel configuration information and E-DCH transport channel configuration information are transmitted to E-DCH UE #1 611, and DPDCH physical channel configuration information and E-DPDCH physical channel information are transmitted to E-DCH UE #1 611. That is, a radio bearer consisting of DTCH 621—DCH 631—DPDCH 632 and a radio bearer consisting of DTCH 621—E-DCH 641—E-DPDCH 642 are set up together with respect to one logical channel for the uplink transmission of cell #1 611.

E-DCH UE #1 611 stores the uplink transport channel type information, the DCH/E-DCH transport channel information and the DPDCH/E-DPDCH physical channel information, and configures the respective transport and physical channels. E-DCH UE #1 611 does not randomly select the two radio bearers to transmit uplink data over the selected radio bearer or does not transmit the uplink data in parallel over the two radio bearers during the uplink data transmission. In an exemplary embodiment of the present invention, if even one cell enabling the E-DCH exists in the active set of E-DCH UE #1 611, E-DCH UE #1 performs the uplink transmission through the E-DCH radio bearer 621, 641, 642, and otherwise, it performs the uplink transmission through the DCH radio bearer 621, 631, 632.

Processes 622 and 623 shows a situation where E-DCH UE #1 611 moves from cell #1 601 to cell #2 602. More specially, process 622 corresponds to a case where E-DCH UE #1 611 is located in a handover area between cell # 1 601 and cell #2 602, and process 623 corresponds to a case where E-DCH UE #1 611 is located only in cell #2 602. In process 622, an active set update procedure for adding a radio link for cell #2 602 is performed. At this time, although cell #2 602 does not support the E-DCH, the active set update procedure is performed without reconfiguring the E-DCH radio bearer which E-DCH UE #1 611 has used in cell #1 601.

The RNC transmits an active set update message to E-DCH UE #1 611 while including an E-DCH enable indicator for identifying whether or not a target cell supports the E-DCH and E-DCH information (e.g., channel configuration information for E-DCH transmission) of the target cell in the active set update message, or transmits a separate message including the E-DCH enable indicator or the E-DCH information to E-DCH UE #1 611. Here, the E-DCH information includes configuration information of a physical channel transmitting control signals of the E-DCH as well as the E-DPDCH. Through the E-DCH enable indicator or the E-DCH information, E-DCH UE #1 611 can be aware of whether or not the target cell (that is, cell #2 602) may support the E-DCH, and stores information about whether or not the target cell supports the E-DCH. In process 622, since cell # 1 601 enabling the E-DCH is included in the active set of E-DCH UE #1 611, the uplink data of E-DCH UE #1 611 is still transmitted through the E-DCH radio bearer 621, 641, 642.

In process 623, E-DCH UE #1 611 is located only in cell # 2 602, and the SRNC removes the radio link of cell #1 601 from the active set of E-DCH UE #1 611 through the active set update as the radio intensity of cell #1 601 becomes weakened, by which process 623 occurs. E-DCH UE #1 611 can be aware of the removal of the radio link with the cell supporting the E-DCH through the active set update and can be aware of absence of cells enabling the E-DCH in the current active set by maintaining a list of cells enabling the E-DCH in the active set stored in process 622. When no cell supporting the E-DCH exists in the active set of E-DCH UE #1 611 in this way, E-DCH UE #1 611 performs the uplink transmission through the already configured DCH radio bearer 621, 631, 632.

As stated above, if even one cell enabling the E-DCH exists in the active set, the uplink transmission is performed over the E-DCH, and otherwise, the uplink transmission is performed over the DCH.

Process 624 shows a situation where E-DCH UE #2 612 moves from cell #2 602 to cell #3 603. E-DCH UE #2 612 has all of the E-DCH radio bearer 621, 741, 642 and the DCH radio bearer 621, 631, 632, and transmits the uplink data through the DCH radio bearer 621, 631, 632 in cell #2 602.

If E-DCH UE #2 612 enters into a handover area between cell #2 602 and cell 33 603, an active set update procedure is performed. At this time, since a target cell (that is, cell #3 603) enables the E-DCH, E-DCH UE #2 612 can recognize the E-DCH enabling of cell #3 603 through an active set update message or a separate message. In this way, E-DCH UE #2 612 already has the E-DCH radio bearer 621, 641, 642, so radio bearer reconfiguration from the DCH to the E-DCH is not caused by the active set update. E-DCH UE #2 612 stores information about whether or not cell #3 603 supports the E-DCH. E-DCH UE #2 612 recognizes that a cell enabling the E-DCH exists in the active set, and performs the uplink transmission through the already configured E-DCH radio bearer 621, 641, 642.

As described above, when the radio bearer for the E-DCH is set up, the E-DCH LUE maps one logical channel to both the DCH and the E-DCH, and previously configures the DCH transport channel configuration information/DPDCH physical channel configuration information and the E-DCH transport channel configuration information/E-DPDCH physical channel configuration information. If even one cell supporting the E-DCH exists in the active set of the E-DCH UE, uplink transmission is performed over the E-DCH, and otherwise, the uplink transmission is performed over the DCH. According to an exemplary method shown in FIG. 6, when the E-DCH UE passes through a network consisting cells supporting the E-DCH and cells not supporting the E-DCH, there is no need for performing frequent radio bearer reconfigurations, so a delay time due to the radio bearer reconfigurations is reduced and signaling overhead for the radio bearer reconfigurations is also reduced.

According to another exemplary embodiment of the present invention, the E-DCH UE measures radio statuses, that is, downlink signal intensities of cells in its active set, and performs uplink transmission through the E-DCH radio bearer only when the radio status of a cell supporting the E-DCH in the active set is superior to a predetermined threshold value. This is intended to prevent the E-DCH UE from performing the uplink transmission over the E-DCH when the cell in the active set may support the E-DCH, but its radio status is inferior to those of other cells in the active set. The threshold value is transmitted to the E-DCH UE through a radio bearer setup message in a radio bearer setup stage or included in system information transmitted over a Broadcast Control Channel (BCCH). If the E-DCH receives the threshold value, it performs the uplink transmission over the E-DCH only when at least one channel having measured Primary Common Channel (P-CPICH) intensity larger than the threshold value exists from among cells supporting the E-DCH in the active set.

Figure 7:
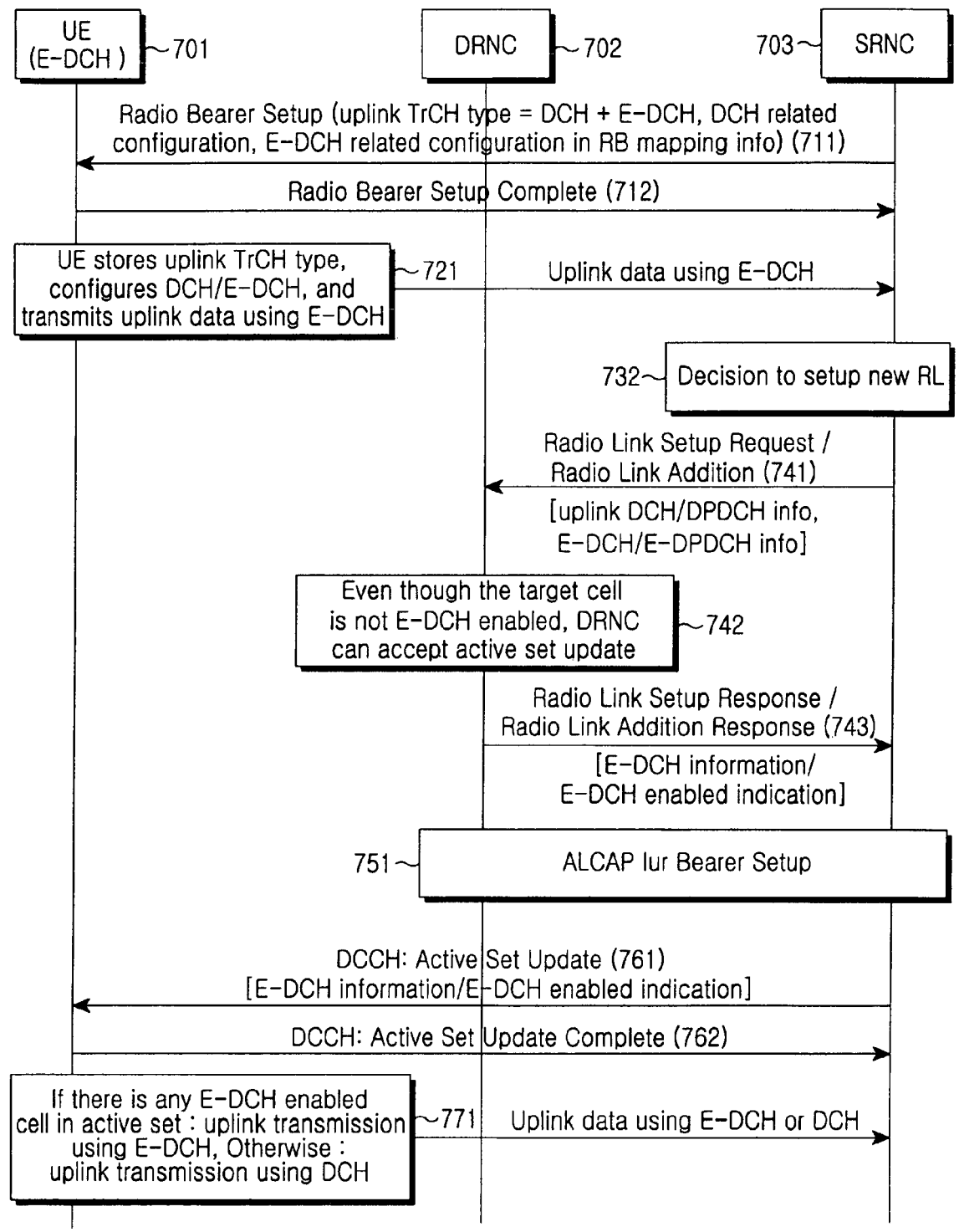
FIG. 7 is a signaling flowchart in accordance with an exemplary embodiment of the present invention.

FIG. 7 shows a signaling flow between the SRNC and a Drift RNC (DRNC) and a signaling flow between the SRNC and the E-DCH UE in accordance with an exemplary embodiment of the present invention. In FIG. 7, it is assumed that the E-DCH UE performs handover to a cell having the same frequency band and a target cell is under the control of an RNC other than the SRNC. In addition, if the target cell is under the control of the SRNC, signaling between the SRNC and the DRNC 741 to 751 in FIG. 7 does not occur. Reference numeral 701 designates the E-DCH UE, reference numeral 702 designates the DRNC controlling the target cell, and reference numeral 703 designates the SRNC of the E-DCH UE.

In steps 711 and 712, the E-DCH UE 701 sets up a radio bearer in a cell enabling the E-DCH. When the cell enabling the E-DCH is under the control of the SRNC, a radio bearer setup message is transmitted from the SRNC 703 to the E-DCH UE 701 in step 711. At this time, an uplink transport channel type included in uplink radio bearer mapping information of the radio bearer setup message is set as 'DCH+E-DCH', and DCH/E-DCH transport channel configuration information and DPDCH/E-DPDCH physical channel configuration information are transmitted together although not shown in the drawing. In step 712, a response message to the radio bearer setup message is transmitted from the E-DCH UE 701 to the SRNC 703.

If the radio bearer setup procedure is successfully performed in steps 711 and 712, the E-DCH UE 701 stores the DCH/E-DCH transport channel configuration information, the DPDCH/E-DPDCH physical channel configuration information and the uplink transport channel type information (i.e., DCH+E-DCH), and configures the respective transport and physical channels pursuant to the configuration information in step 721. The E-DCH UE 701 also stores information about whether or not each cell in its active set enables the E-DCH according to cell IDs or P-CPICH codes. Since only a current cell exists in the active set when the radio bearer setup message is received, the E-DCH UE 701 can be aware that the current cell supports the E-DCH based on the uplink transport channel type information. In FIG. 7, a radio bearer for the E-DCH has been set up in the cell enabling the E-DCH, so the cell, in which the E-DCH UE 701 is currently located, is stored as a cell enabling the E-DCH in the active set. The E-DCH UE 701 performs uplink transmission using the radio bearer including the E-DCH, that is, an E-DCH radio bearer in step 721 because the cell enabling the E-DCH exists in the active set.

As the E-DCH UE 701 moves to a target cell under the control of the DRNC 702, the SRNC 703 decides in step 732 to add a new radio link. Such a decision is made on the basis of a report on the measurement result between cells, which is transmitted from the E-DCH UE 701. That is, if the measurement result of target cell signal intensity is sufficiently strong, then the SRNC 703 decides to add the new radio link of the target cell. If a decision is made to add the new radio link, the SRNC 703 transmits a radio link setup request message to the DRNC 702 in step 741. The radio link setup request message is a message which is transmitted when the E-DCH UE 701 moves for the first time to a cell under the control of the DRNC 702. Otherwise, if the E-DCH UE 701 has moved to the cell under the control of the DRNC 702 before, a radio link addition message is transmitted.

The radio link setup request message or the radio link addition message also includes the E-DCH/E-DPDCH configuration information as well as the uplink DCH/DPDCH configuration information set up in steps 711 and 712. Such channel configuration information may be included in both the radio link setup request message and the radio link addition message or may be included in only the radio link setup request message. The DRNC 702 may store the channel configuration information transmitted through the radio link setup request message and refer to the channel configuration information when it receives the radio link addition message in the future.

In step 742, the DRNC 702 determines if the target cell enables the E-DCH, and if so, it carries E-DCH information of the target cell (e.g., channel configuration information for E-DCH transmission) in a radio link setup response message or a radio link addition response message and transmits the message, or sets an E-DCH enable indicator as 'true' and transmits the E-DCH enable indicator in step 743. If the target cell does not support the E-DCH and supports only the DCH, the radio link setup response message or the radio link addition response message does not include the E-DCH information or includes the E-DCH enable indicator set as 'false'.

In step 751, an Iur bearer is set up based on an Access Link Control Application Part (ALCAP) for setting up a data transmission bearer between the SRNC 703 and the DRNC 702. In step 761, the SRNC 703 transmits an active set update message, which is created on the basis of the E-DCH information or the E-DCH enable indicator received in step 743, to the E-DCH UE 701 over a Dedicated Control Channel (DCCH). If the E-DCH information is included or the E-DCH enable indicator is set as 'true' in the active set update message, the E-DCH UE 701 recognized that the target cell can supports the E-DCH and stores this. In step 762, the E-DCH UE 701 transmits a response message to the active set update message to the SRNC 703 over the DCCH.

In step 771, the E-DCH 701 transmits the uplink data over the E-DCH or the DCH which is selected with reference to the active set updated according to the active set update message. That is, the E-DCH UE 701 performs the uplink transmission through the E-DCH bearer set up in steps 711 and 712 if a cell supporting the E-DCH exists in the active set, and performs the uplink transmission through the DCH bearer set up in steps 711 and 712 if no cell supporting the E-DCH exists in the active set.

Figure 8:
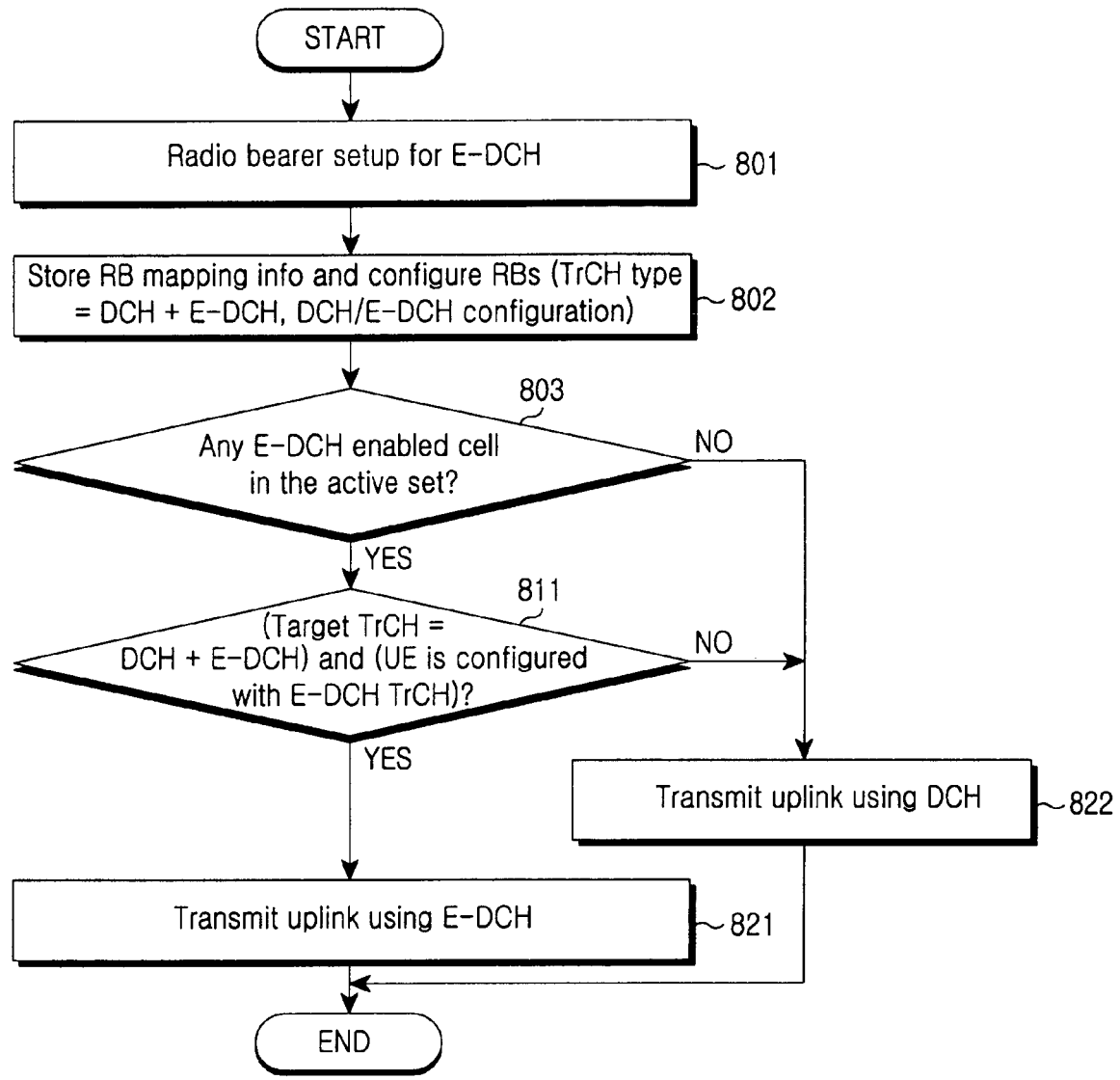
FIG. 8 is an operational flowchart of the UE in accordance with an exemplary embodiment of the present invention.

FIG. 8 is a flowchart showing operations of the E-DCH UE in accordance with an exemplary embodiment of the present invention.

In step 801, the E-DCH UE receives a radio bearer setup message including radio bearer mapping information. In step 802, the E-DCH UE stores an uplink transport channel type, that is, 'DCH+E-DCH' included in the radio bearer mapping information and DCH/E-DCH transport channel configuration information, and configures all DCH/E-DCH radio bearers including the above-mentioned transport channels according to the channel type information and the channel configuration information.

In step 803, the E-DCH UE checks if a cell supporting the E-DCH exists in the active set. If the cell supporting the E-DCH exists in the active set, the E-DCH UE proceeds to step 811 to check if the stored uplink transport channel type is 'DCH+E-DCH' and the E-DCH transport channel is configured. If the stored uplink transport channel type is 'DCH+E-DCH' and the E-DCH transport channel is configured, the E-DCH UE proceeds to step 821 to perform the uplink transmission using the E-DCH radio bearer. In contrast with this, if no cell supporting the E-DCH exists in the active set or the conditions in step 811 are not satisfied, the E-DCH UE proceeds to step 822 to perform the uplink transmission using the DCH radio bearer.

According to another exemplary embodiment of the present invention, between steps 803 and 811 in FIG. 8, the E-DCH UE checks if at least one cell, which has radio intensity satisfying a predetermined threshold value, exists from among cells enabling the E-DCH in the active set. If at least one cell enabling the E-DCH and satisfying the threshold value condition exists in the active set, the E-DCH proceeds to step 811, and otherwise, proceeds to step 822.

Figure 9:
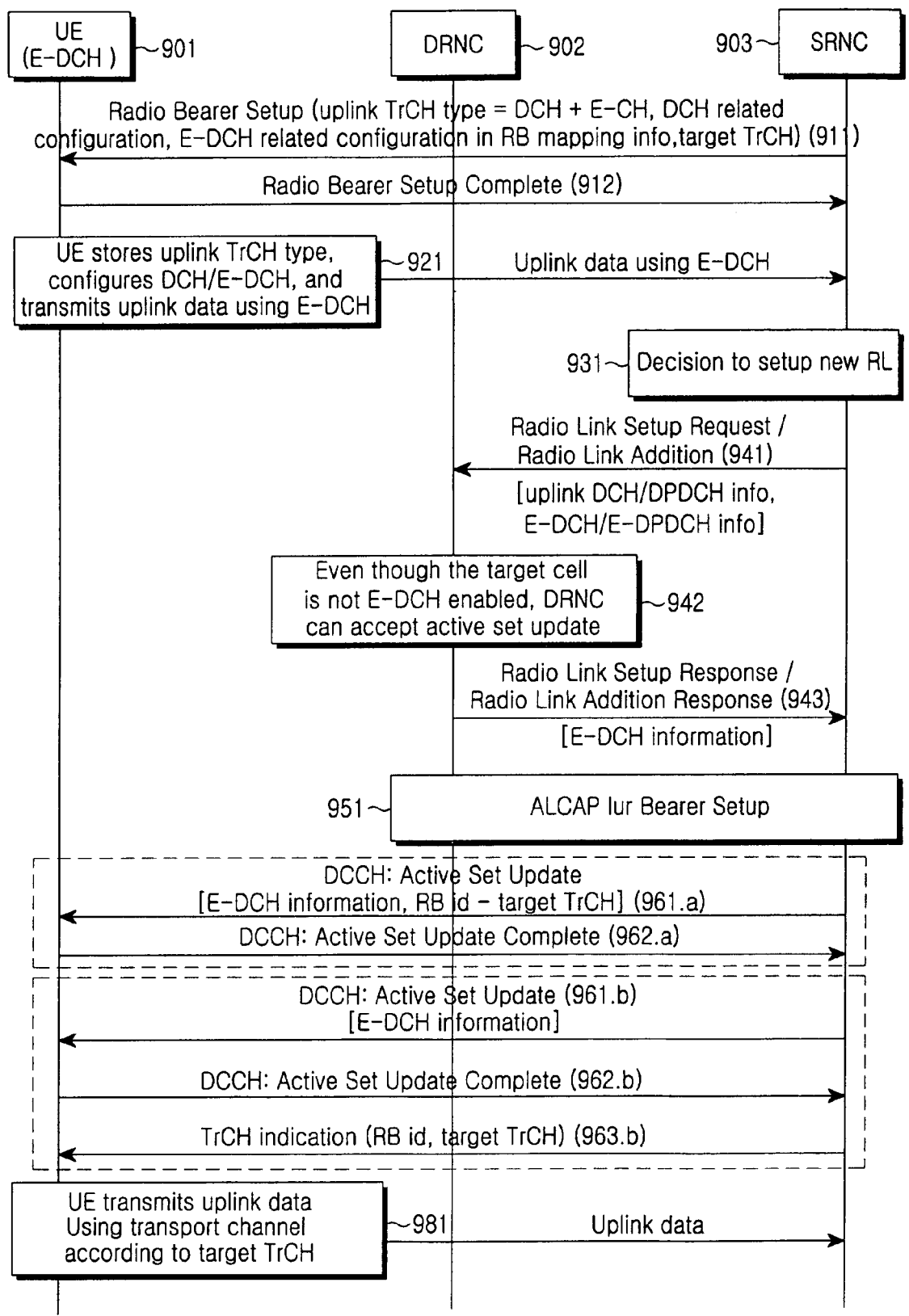
FIG. 9 is a schematic view showing an uplink transmission operation of an E-DCH UE in an handover area, which is proposed in accordance with an exemplary embodiment of the present invention.

FIG. 9 shows an uplink transmission operation of an E-DCH UE in a handover area in accordance with an exemplary of the present invention. Whereas the E-DCH UE itself determines which channel of the DCH channel and the E-DCH channel it uses in the second preferred embodiment as describe above, the E-DCH UE receives a transport channel indicator for a channel to be used from the SRNC and selects the channel indicated by the transport channel indicator in the third preferred embodiment. In an exemplary implementation, the transport channel indicator indicates a channel to be changed for a specific radio bearer. That is, an exemplary embodiment of the present invention provides a UE-based determination method and another exemplary embodiment of the present invention provides an SRNC-based determination method.

Reference numeral 901 designates the E-DCH UE, reference numeral 902 designates the DRNC, and reference numeral 903 designates the SRNC.

In steps 911 and 912, the E-DCG UE 901 sets up a radio bearer in a cell which enables the E-DCH and is under the control of the SRNC 903. More specially, the SRNC 903 transmits a radio bearer setup message including uplink radio bearer mapping information to the E-DCH UE 901 in step 911. An uplink transport channel type included in the uplink radio bearer mapping information is set as 'DCH+E-DCH', and DCH/E-DCH transport channel configuration information and DPDCH/E-DPDCH physical channel configuration information are included in the uplink radio bearer mapping information. Also, the radio bearer setup message includes target transport channel (target TrCH) information representing a channel to be used by the E-DCH UE. That is, the SRNC 903 determines whether the E-DCH UE 901 uses the DCH or the E-DCH and clearly informs the E-DCH UE of the channel to be used through the target TrCH information. In step 912, a response message to the radio bearer setup message is transmitted from the E-DCH UE 901 to the SRNC 903.

In step 921, the E-DCH UE stores the uplink transport channel type and the channel configuration information, and then configures both a DCH radio bearer and an E-DCH radio bearer according to the stored information. Thereafter, the E-DCH UE performs uplink transmission using the transport channel indicated by the transport channel indicator.

As the E-DCH UE 901 moves to a target cell not under the control of the SRNC 903 but under the control of the DRNC 902, the SRNC 903 decides in step 931 to add a new radio link. Such a decision is made on the basis of a report on the measurement result between cells, which is transmitted from the E-DCH UE 901. That is, if the measurement result of target cell signal intensity is sufficiently strong, then the SRNC 903 decides to add the new radio link of the target cell. If a decision is made to add the new radio link, the SRNC 903 transmits a radio link setup request message to the DRNC 902 in step 941. The radio link setup request message is a message which is transmitted when the E-DCH UE 901 moves for the first time to a cell under the control of the DRNC 902. Otherwise, if the E-DCH UE 901 has moved to the cell under the control of the DRNC 902 before, a radio link addition message is transmitted.

The radio link setup request message or the radio link addition message also includes the E-DCH/E-DPDCH configuration information as well as the uplink DCH/DPDCH configuration information set up in steps 911 and 912. Such channel configuration information may be included in both the radio link setup request message and the radio link addition message or may be included in only the radio link setup request message. The DRNC 902 may store the channel configuration information received from the radio link setup request message and refer to the channel configuration information when it receives the radio link addition message in the future.

In step 942, the DRNC 902 determines if the target cell enables the E-DCH, and if so, it carries E-DCH information of the target cell (e.g., channel configuration information for E-DCH transmission) in a radio link setup response message or a radio link addition response message and transmits the message, or sets an E-DCH enable indicator as 'true' and transmits the E-DCH enable indicator in step 943. If the target cell does not support the E-DCH and supports only the DCH, the radio link setup response message or the radio link addition response message does not include the E-DCH information or includes the E-DCH enable indicator set as 'false'.

In step 951, an Iur bearer for setting up a data transmission bearer between the SRNC 903 and the DRNC 902 is set up. Following step 951, steps 961.*a* and 962.*a* or steps 961.*b* and 962.*b* are carried out.

In step 961.*a*, the SRNC 903 transmits an active set update message, which is created on the basis of the E-DCH information or the E-DCH enable indicator, to the E-DCH UE 901 over a DCCH. If the target cell enables the E-DCH, the E-DCH information may be included in the active set update message, and otherwise, the E-DCH information is not included in the active set update message. The E-DCH UE 901 stores the E-DCH information if the E-DCH information is included in the active set update message, but does not necessarily use the E-DCH. That is, in an exemplary embodiment as shown in FIG. 6, the E-DCH UE 601 performs the uplink transmission using the E-DCH if a cell enabling the E-DCH exists in its active set, but the E-DCH UE 901 changes the transport channel only when it receives a clear transport channel indicator from the SRNC 903 in the embodiment as shown in FIG. 9. To this end, a radio bearer ID (RB id) and target transport channel (target TRCH) information are included in the active set update message. In step 962.*a*, the E-DCH UE 901 transmits a response message to the active set update message to the SRNC 903 over the DCCH.

The RB id and the target TrCH information are used for indicating a transport channel corresponding to the RB id using the existing message such as the active set update message. In another case, a new message including the RB id and the target TrCH information, that is, a transport channel indication message may be used. The E-DCH UE 901 receives the active set update message including the E-DCH information to store the E-DCH in step 961.*b*, and then transmits a response message to the active set update message to the SRNC 903 in step 962.*b*. In step 963.*b*, the SRNC 903 transmits the transport channel indication message including the RB id and the target TrCH information separately from the active set update message. The transport channel indication message may be transmitted when the active set of the E-DCH UE 901 is updated or the SRNC 903 intends to change the transport channel of the E-DCH UE 901.

If the target TrCH information corresponding to the RB id is included in the active set update message in step 961.*a* or the transport channel indication message is received in step 963.*b*, the E-DCH UE 901 selects a transport channel indicated by the TrCH information or the transport channel indication message.

At this time, if the transport channel indicated from the SRNC 903 is the E-DCH, in step 981, the E-DCH UE 901 performs the uplink transmission using the E-DCH radio bearer configured in step 921. On the contrary, if the transport channel indicated from the SRNC 903 is the DCH, in step 981, the E-DCH UE 901 performs the uplink transmission using the DCH radio bearer configured in step 921.

Figure 10A:
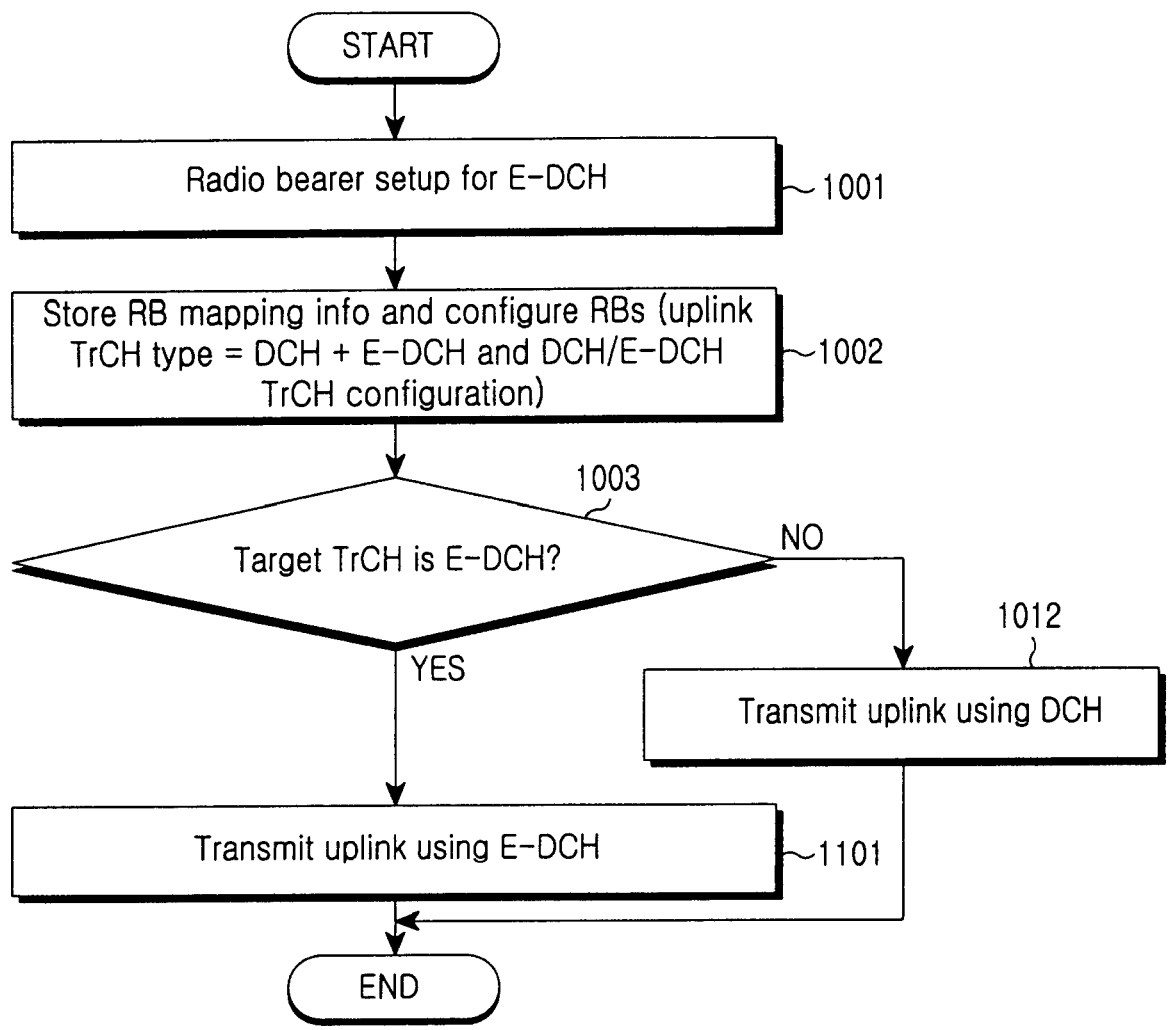
FIG. 10 is an operational flowchart of the UE in accordance with an exemplary of the present invention.
Figure 10B:
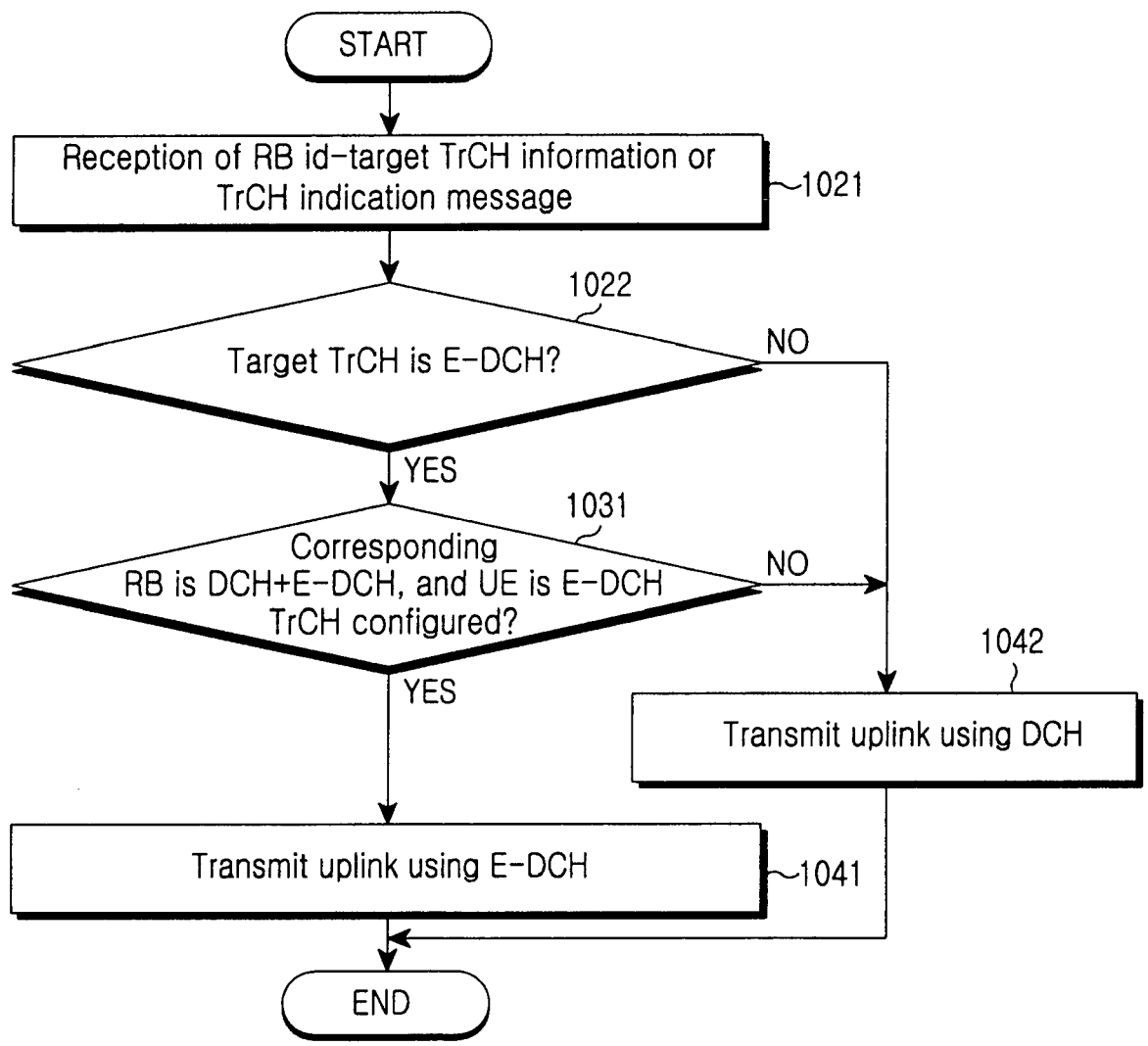

FIGS. 10a and 10b shows operational flows of the E-DCH UE in accordance with an exemplary embodiment of the present invention. The operational flow in FIG. 10b may be performed after the setups of radio bearers according to FIG. 10a.

Referring to FIG. 10a, in step 1001, the E-DCH UE receives the radio bearer setup message including the radio bearer mapping information and the target TrCH information. In step 1002, the E-DCH UE stores the uplink transport channel type of the radio bearer mapping informatio. That is, 'DCH+E-DCH' and the DCH/E-DCH transport channel configuration information, and configure all the DCH/E-DCH radio bearers including the transport channels according to the channel type and the channel configuration information. In step 1003, the E-DCH UE checks if the target TrCH information indicates the E-DCH. If the target TRCH information indicates the E-DCH, the E-DCH UE performs the uplink transmission using the E-DCH in step 1011, and otherwise, it performs the uplink transmission using the DCH in step 1012.

Referring to FIG. 10b, the E-DCH UE receives the transport channel indicator including the RB id and the target TrCH information through the active set update message or the transport channel indication message in step 1021, and checks if the target TrCH information indicates the E-DCH in step 1022. If the target TRCH information indicates the E-DCH, the E-DCH UE proceeds to step 1031 to check if the uplink transport channel type of the radio bearer indicated by the RB id is 'DCH+E-DCH' and the E-DCH transport channel is configured for the radio bearer. If these conditions are all 'true' in step 1031, the E-DCH UE proceeds to step 1041 to perform the uplink transmission using the E-DCH radio bearer. If the target transport channel is the DCH in step 1022 or the conditions in step 1031 are 'false', the E-DCH UE proceeds to step 1042 to perform the uplink transmission using the DCH radio bearer.

Figure 11:
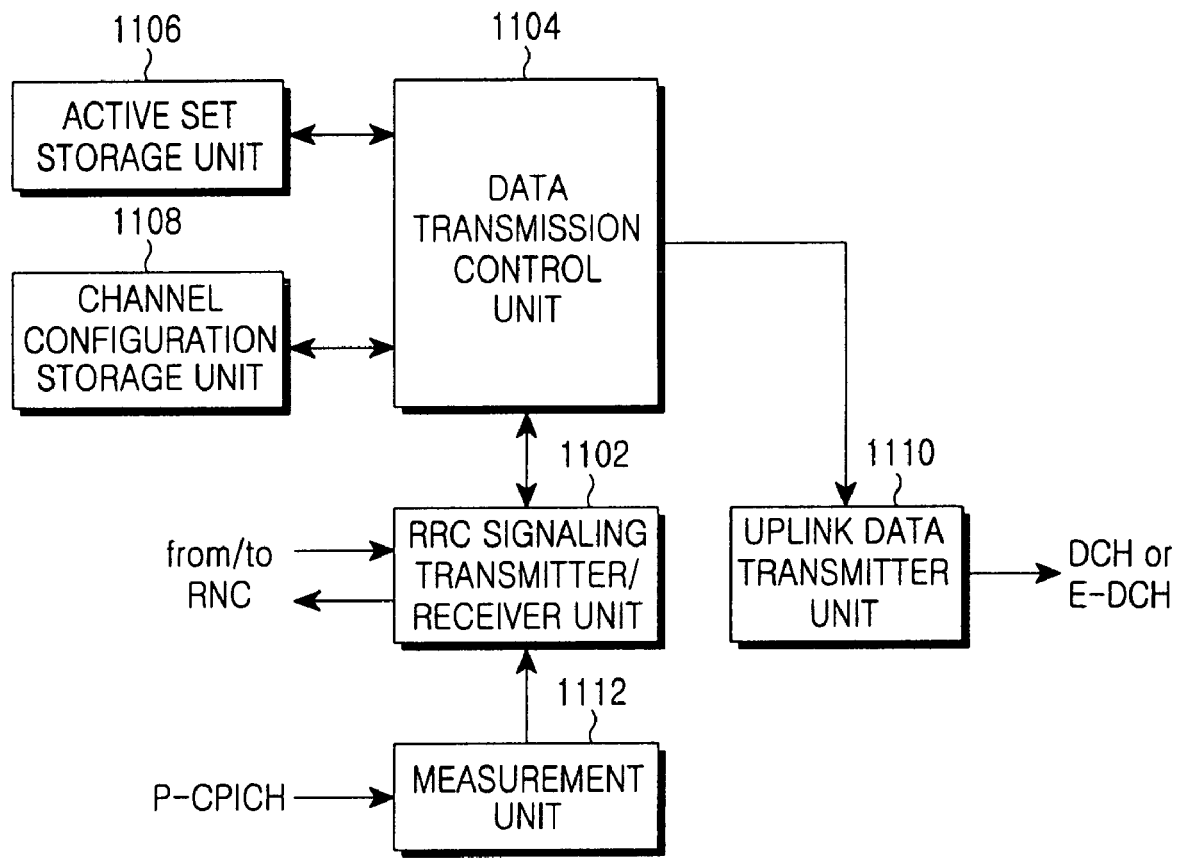
FIGS. 11 and 12 are schematic views showing architectures of a UE and an SRNC in accordance with an exemplary embodiment of the present invention.
Figure 12:
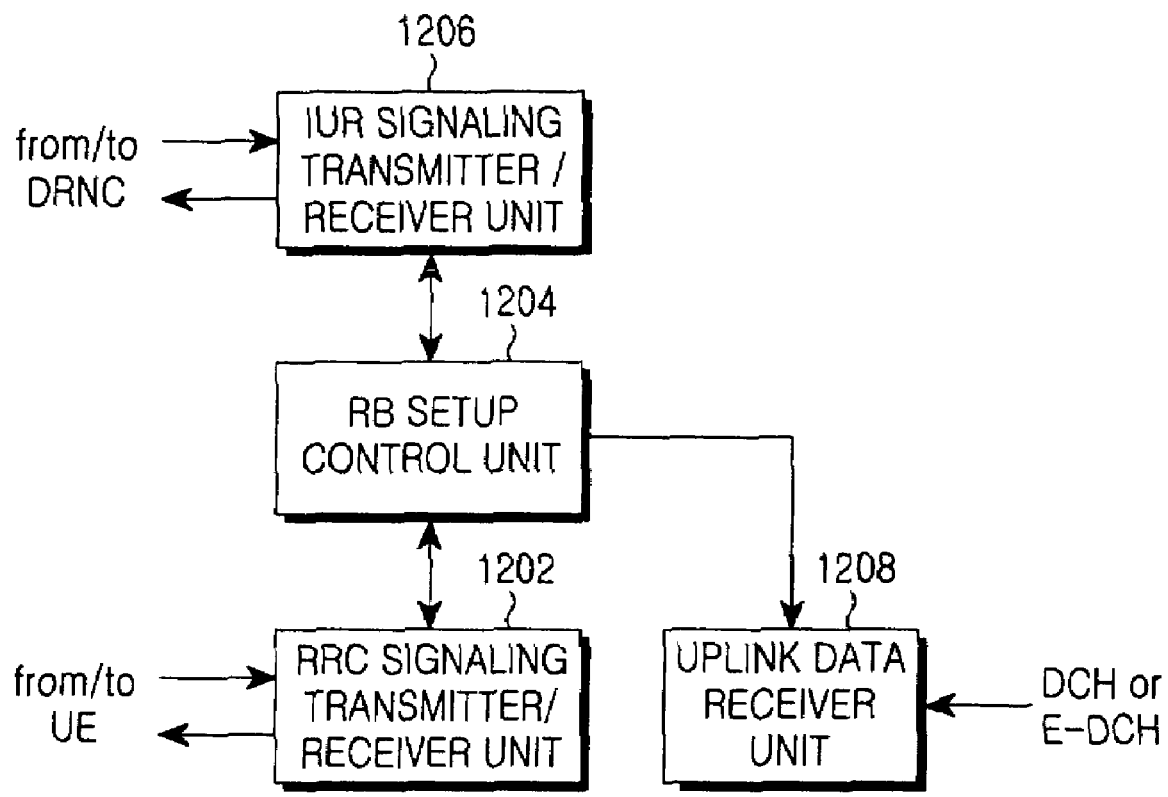

FIGS. 11 and 12 show architectures of a UE and an SRNC in accordance with an exemplary embodiment of the present invention.

Referring first to FIG. 11, an RRC signaling transmitter/receiver unit 1102 receives a radio bearer setup message from the SRNC, transmits uplink radio bearer mapping information and target TrCH information (in a case of the third embodiment) included in the radio bearer setup message to a data transmission control unit 1104, and then transmits a radio bearer setup completion message to the SRNC. The data transmission control unit 1104 stores an uplink transport channel type (that is, DCH+E-DCH) and DCH/E-DCH configuration information included the uplink radio bearer mapping information in a channel information storage unit 1108, and then configures radio bearers consisting of the respective transport and physical channels in an uplink data transmitter unit 1110 pursuant to the channel type and the configuration information.

Once the radio bearers are configured, the data transmission control unit 1104 decides whether an E-DCH or a DCH is used in the current cell with reference to an active set stored in an active set storage unit 1106 or the target TrCH information. Such a decision may be made according to whether or not a cell supporting the E-DCH or a cell which has signal intensity satisfying a given threshold value and supports the E-DCH exists in the active set including the current cell, or whether or not the target transport channel information exists. The data transmission control unit 1104 controls the data transmitter unit 1110 such that it uses the E-DCH radio bearer or the DCH radio bearer according to the decision result. The uplink data transmitter unit 1110 transmits uplink data through the E-DCH radio bearer or the DCH radio bearer based on the control of the data transmission control unit 1104.

In addition, a measurement unit 1112 measures P-CPICH signal intensities of all cells detectable by the E-DCH UE, and provides the measurement result to the RRC signaling transmitter/receiver unit 1102. The RRC signaling transmitter/receiver unit 1102 reports the measurement result to the SRNC, and receives an active set update message from the SRNC to provide it to the data transmission control unit 1104.

The data transmission control unit 1104 updates the active set stored in the active set storage unit 1106 according to the active set update message, and controls the uplink data transmitter unit 1110 such that it uses the E-DCH radio bearer or the DCH radio bearer according to the updated active set or a transport channel indicator included in the active set update message. Also, when the RRC signaling transmitter/receiver unit 1102 receives a transport channel indication message, the data transmission control unit 1104 controls the uplink data transmitter unit 1110 such that it uses the E-DCH radio bearer or the DCH radio bearer according to the transport channel indication message.

Next, Referring to FIG. 12, an RB setup control unit 1204 creates uplink radio bearer mapping information and target TrCH information (in a case of the third embodiment) for an E-DCH UE desiring an uplink data service. The uplink radio bearer mapping information includes an uplink transport channel type (that is, DCH+E-DCH) and DCH/E-DCH configuration information. An RRC signaling transmitter/receiver unit 1202 transmits a radio bearer setup message including the uplink radio bearer mapping information and, in an exemplary implementation, the target TrCH information to the E-DCH UE desiring an uplink data service. Thereafter, an uplink data receiver unit 1208 receives uplink data through an E-DCH radio bearer or a DCH radio bearer selected by the E-DCH UE or indicated by the target TrCH information.

The RRC signaling transmitter/receiver unit 1202 receives a report on a P-CPICH measurement result from the E-DCH UE to provide signal intensity of a target cell included in the report to the RB setup control unit 1204. If the RB setup control unit 1204 decides to add a radio link of the target cell to the E-DCH UE according to the signal intensity, the RRC signaling transmitter/receiver unit 1202 transmits an active set update message, which includes E-DCH information of cells included in the active set or the E-DCH information and, in an exemplary implementation, a transport channel indicator, to the E-DCH UE. At this time, when the target cell is not under the control of the RC setup control unit 1204, the Iur signaling transmitter/receiver unit 1206 transmits a radio link setup/addition message including channel configuration information of the E-DCH UE to a DRNC controlling the target cell, and receives a response message including the E-DCH information of the target cell to provide it to the RB setup control unit 1204. Then, the RB setup control unit 1204 sets up the E-DCH information of the active set update message with reference to the E-DCH information of the target cell. In another case, the RRC signaling transmitter/receiver unit 1202 transmits a transport channel indication message including the transport channel indicator to the E-DCH UE according to the control of the RB setup control unit 1204.

Similarly, the uplink data receiver unit receives the uplink data through the DCH or E-DCH radio bearer selected by the E-DCH UE or indicated by the transport channel indicator.

As describe above, exemplary implementations of the present invention enable UEs, which are located in a handover area between a cell supporting an E-DCH and a cell not supporting the E-DCH, to effectively map an uplink logical channel and a transport channel when using the E-DCH in a mobile telecommunication system employing a CDMA scheme, thereby reducing a delay time due to radio bearer reconfigurations and also reducing signaling overhead for the radio bearer reconfigurations.

While exemplary embodiments of the present invention have been shown and described with reference to certain implementations thereof, it will be understood by those skilled in the art that various changes and modifications may be made therein without departing from the spirit and scope of the present invention as defined by the appended claims.

What is claimed is:

1. A method for transmitting uplink data by user equipment (UE) in a mobile telecommunication system which supports Uplink Dedicated Channel (DCH) and Enhanced Uplink Dedicated Channel (E-DCH) for an uplink service, the E-DCH being enhanced in comparison with the DCH, the UE moving to a location where an active set of cells of the UE include at least two cells, the active set of cells of the UE being a set of cells that the UE is simultaneously connected to, the method comprising the steps of:

configuring a first radio bearer comprising the DCH and a second radio bearer comprising the E-DCH for the uplink service to be transmitted;

determining whether the active set of cells of the UE comprises at least one cell supporting the E-DCH;

transmitting the uplink data through the first radio bearer if no cell in the active set of cells of the UE supports the E-DCH; and transmitting the uplink data through the second radio bearer if the active set of cells of the UE comprises at least one cell supporting the E-DCH.

2. The method as claimed in claim 1, further comprising the steps of:

receiving from a serving radio network controller SRNC a radio bearer setup message, the message comprising an uplink transport channel type which indicates at least that a logical channel related to the uplink service is mapped to the DCH and the E-DCH;

receiving from the SRNC channel configuration information of the DCH and the E-DCH; and receiving from the SRNC channel configuration information of first and second physical channels to which the DCH and the E-DCH are mapped, respectively.

3. The method as claimed in claim 2, wherein the step of configuring the first and second radio bearers comprises the steps of:

storing the uplink transport channel type;

configuring the first radio bearer comprising the logical channel according to the channel configuration information;

configuring the DCH and the first physical channel according to the channel configuration information;

configuring the second radio bearer comprising the logical channel according to the channel configuration information; and configuring the E-DCH and the second physical channel according to the channel configuration information.

4. The method as claimed in claim 1, further comprising the steps of:

receiving an active set update message comprising enable indicator information, which indicates whether or not a target cell supports the E-DCH, as the UE moves to the target cell;

transmitting the uplink data through the first radio bearer if no cell in the active set of the cells of the UE updated according to the active set update message supports the E-DCH; and transmitting the uplink data through the second radio bearer if the active set updated according to the active set update message comprises at least one cell supporting the E-DCH.

5. The method as claimed in claim 1, further comprising the steps of:

determining whether at least one cell supporting the E-DCH comprises a radio status measurement value exceeding a predetermined threshold value when the cells of the UE comprise the at least one cell supporting the E-DCH;

transmitting the uplink data through the first radio bearer if the at least one cell supporting the E-DCH does not comprise the radio status measurement value exceeding the predetermined threshold value; and transmitting the uplink data through the second dedicated radio bearer if the at least one cell supporting the E-DCH comprises the radio status measurement value exceeding the predetermined threshold value.

6. A method for transmitting uplink data by user equipment (UE) in a mobile telecommunication system which supports Uplink Dedicated Channel (DCH) and Enhanced Uplink Dedicated Channel (E-DCH) for an uplink service, the E-DCH being enhanced in comparison with the DCH, the UE moving to a location where an active set of cells of the UE include at least two cells, the active set of cells of the UE being a set of cells that the UE is simultaneously connected to, the method comprising the steps of:

receiving target transport channel information comprising at least one of a first indication of the DCH and a second indication of the E-DCH from an SRNC for controlling radio resources of the UE;

configuring a first radio bearer comprising the DCH and a second radio bearer comprising the E-DCH for the uplink service to be transmitted;

transmitting the uplink data through the first radio bearer when the target transport channel information comprises the first indication of the DCH; and transmitting the uplink data through the second radio bearer when the target transport channel information comprises the second indication of the E-DCH, wherein the target transport channel information comprises the first indication of the DCH if no cell in an active set of cells of the UE supports the E-DCH, and the target transport channel information comprises the second indication of the E-DCH if the active set of cells of the UE comprises at least one cell supporting the E-DCH.

7. The method as claimed in claim 6, wherein the step of receiving the target transport channel information comprises:

receiving from a serving radio network controller (SRNC) a radio bearer setup message comprising an uplink transport channel type which indicates at least that a logical channel related to the uplink service is mapped to the DCH and the E-DCH;

receiving from the SRNC channel configuration information of the DCH and E-DCH;

receiving from the SRNC channel configuration information of first and second physical channels to which the DCH and the E-DCH are mapped, respectively; and receiving from the SRNC the target transport channel information.

8. The method as claimed in claim 7, wherein the step of configuring the first and second radio bearers comprises the steps of:
   storing the uplink transport channel type;
   configuring the first radio bearer comprising the logical channel according to the channel configuration information;
   configuring the DCH and the first physical channel according to the channel configuration information;
   configuring the second radio bearer comprising the logical channel according to the channel configuration information;
   configuring the E-DCH and the second physical channel according to the channel configuration information.

9. The method as claimed in claim 6, further comprising the steps of:
   receiving an active set update message comprising enable indicator information, which indicates whether or not a target cell supports the E-DCH, as the UE moves to the target cell;
   acquiring transport channel indication information indicating a dedicated transport channel to be used in the target cell through at least one of the active set update message and a transport channel indication message; and
   transmitting the uplink data through at least one of the first radio bearer and the second radio bearer according to the transmission indication information.

10. A user equipment (UE) apparatus for transmitting uplink data in a mobile telecommunication system which supports Uplink Dedicated Channel (DCH) and Enhanced Uplink Dedicated Channel (E-DCH) for an uplink service, the E-DCH being enhanced in comparison with the DCH, the UE moving to a location where an active set of cells of the UE include at least two cells, the active set of cells of the UE being a set of cells that the UE is simultaneously connected to, the apparatus comprising:
   a radio resource control RRC signaling transmitter/receiver unit for transmitting/receiving signaling messages;
   a data transmission control unit for communicating with the RRC signaling transmitter/receiver unit to store an uplink transport channel type indicating at least that a logical channel related to the uplink service to be transmitted is mapped to at least one of the Uplink Dedicated Channel (DCH) and Enhanced Uplink Dedicated Channel (E-DCH), to store channel configuration information for a first radio bearer comprising the DCH and for a second radio bearer comprising the E-DCH, and to select at least one of the first radio bearer and the second radio bearer for the uplink service; and
   an uplink data transmitter unit for configuring the first radio bearer comprising the logical channel, the DCH and a first physical channel to which the DCH is mapped, for configuring the second radio bearer comprising the logical channel, the E-DCH and a second physical channel to which the E-DCH is mapped, and for transmitting the uplink data through the at least one of the first and second radio bearer selected by the data transmission control unit;
   wherein the data transmission control unit selects the first radio bearer if no cell in an active set of cells of the UE supports the E-DCH, and selects the second radio bearer if the active set of cells of the UE comprises at least one cell supporting the E-DCH.

11. The apparatus as claimed in claim 10, wherein: the data transmission control unit determines whether the at least one cell supporting the E-DCH comprises a radio status measurement value exceeding a predetermined threshold value; and the first radio bearer is selected if the at least one cell supporting the E-DCH does not comprise the radio status measurement value exceeding the predetermined threshold value; and the second dedicated radio bearer is selected if the at least one cell supporting the E-DCH comprises the radio status measurement value exceeding the predetermined threshold value.

12. The apparatus as claimed in claim 10, wherein the data transmission control unit selects the first or second radio bearer according to at least one of target transport channel information and transport channel indication information received from the SRNC and transmitted to the RRC signaling transmitter/receiver unit.

13. A method for receiving uplink data from user equipment (UE) in a radio network controller of a mobile telecommunication system which uses Uplink Dedicated Channel (DCH) and Enhanced Uplink Dedicated Channel (E-DCH) for an uplink service and at least one cell of which supports the E-DCH, the E-DCH being enhanced in comparison with the DCH, the UE moving to a location where an active set of cells of the UE include at least two cells, the active set of cells of the UE being a set of cells that the UE is simultaneously connected to, the method comprising the steps of:
   setting up first channel configuration information for a first radio bearer comprising the DCH and second channel configuration information for a second radio bearer comprising the E-DCH according to a requested uplink service;
   transmitting the first and second channel configuration information in a radio bearer setup message to the UE; and
   receiving the uplink data from the UE through at least one of the first radio bearer and the second radio bearer selected according to a change in the active set of cells of the UE;
   wherein the first radio bearer is selected if no cell in an active set of cells of the UE supports the E-DCH, and the second radio bear is selected if the active set of cells of the UE comprises at least one cell supporting the E-DCH.

14. The method as claimed in claim 13, wherein the radio bearer setup message comprises:
   an uplink transport channel type indicating that a logical channel related to the uplink service is mapped to the DCH and the E-DCH;
   channel configuration information of the DCH and the E-DCH; and
   channel configuration information of first and second physical channels to which the DCH and the E-DCH are mapped, respectively.

15. The method as claimed in claim 13, further comprising the step of transmitting an active set update message comprising an enable indicator information, which indicates whether or not a target cell supports the E-DCH, to the UE as the UE moves to the target cell.

16. The method as claimed in claim 15, further comprising the steps of:
   transmitting at least one of a radio link setup request message and a radio link addition message comprising the first channel configuration information and the second channel configuration information to a drift radio network controller (DRNC) controlling the target cell as the UE moves to the target cell; and
   receiving from the DRNC at least one of a radio link setup response message and a radio link addition response message comprising the enable indicator information, which indicates whether or not the target cell supports the E-DCH.

17. A method for receiving uplink data from user equipment (UE) in a radio network controller of a mobile telecommunication system which uses Uplink Dedicated Channel (DCH) and Enhanced Uplink Dedicated Channel (E-DCH) for an uplink service and at least one cell of which supports the E-DCH, the E-DCH being enhanced in comparison with the DCH, the UE moving to a location where an active set of cells of the UE include at least two cells, the active set of cells of the UE being a set of cells that the UE is simultaneously connected to, the method comprising the steps of:

setting up first channel configuration information for a first radio bearer comprising the DCH and second channel configuration information for a second radio bearer comprising the E-DCH according to a requested uplink service;

transmitting the first channel configuration information, the second channel configuration information and target transport channel information indicating at least one of the DCH and the E-DCH to be used by the UE in a radio bearer setup message to the UE; and receiving the uplink data from the UE through at least one of the first radio bearer and the second radio bearer selected according to the target transport channel information;

wherein the first radio bearer is selected if no cell in an active set of cells of the UE supports the E-DCH, and the second radio bear is selected if the active set of cells of the UE comprises at least one cell supporting the E-DCH.

18. The method as claimed in claim 17, wherein the radio bearer setup message comprises:

an uplink transport channel type indicating that a logical channel related to the uplink service is mapped to the DCH and the E-DCH;

channel configuration information of the DCH and the E-DCH; and channel configuration information of first and second physical channels to which the DCH and the E-DCH are mapped, respectively.

19. The method as claimed in claim 17, further comprising the steps of:

transmitting an active set update message comprising enable indicator information, which indicates whether or not a target cell supports the E-DCH, as the UE moves to the target cell; and transmitting transport channel indication information indicating a dedicated transport channel to be used in the target cell through the active set update message or a transport channel indication message.

20. The method as claimed in claim 19, further comprising the steps of:

transmitting at least one of a radio link setup request message and a radio link addition message comprising the first channel configuration information and the second channel configuration information to a DRNC controlling the target cell as the UE moves to the target cell;

receiving at least one of a radio link setup response message and a radio link addition response message comprising the enable indicator information, which indicates whether or not the target cell supports the E-DCH, from the DRNC; and setting up a radio bearer for uplink data communication with the DRNC.

21. A radio network controller apparatus for receiving uplink data from user equipment (UE) in a mobile telecommunication system which uses Uplink Dedicated Channel (DCH) and Enhanced Uplink Dedicated Channel (E-DCH) for an uplink service and at least one cell of which supports the E-DCH, the E-DCH being enhanced in comparison with the DCH, the UE moving to a location where an active set of cells of the UE include at least two cells, the active set of cells of the UE being a set of cells that the UE is simultaneously connected to, the apparatus comprising:

a radio bearer setup control unit for setting up an uplink transport channel type indicating that a logical channel related to a requested uplink service is mapped to at least one of the Uplink Dedicated Channel (DCH) and Enhanced Uplink Dedicated Channel (E-DCH), first channel configuration information for a first radio bearer comprising the DCH, and second channel configuration information for a second radio bearer comprising the E-DCH;

a radio resource control (RRC) signaling transmitter/receiver unit for transmitting a radio bearer setup message comprising the uplink transport channel type, the first channel configuration information, and second channel configuration information, to the UE; and an uplink data receiver unit for receiving the uplink data from the UE through at least one of the first radio bearer and the second radio bearer selected after the UE sets up the first radio bearer and the second radio bearer based on the uplink transport channel type and the first and second channel configuration information;

wherein the first radio bearer is selected if no cell in an active set of cells of the UE supports the E-DCH, and the second radio bear is selected if the active set of cells of the UE comprises at least one cell supporting the E-DCH.

22. The apparatus as claimed in claim 21, wherein the RRC signaling transmitter/receiver unit transmits to the UE target transport channel information indicating the first or second radio bearer, for use by the UE.

23. The apparatus as claimed in claim 21, wherein the RRC signaling transmitter/receiver unit transmits an active set update message comprising enable indicator information, which indicates whether or not a target cell supports the E-DCH, as the UE moves to the target cell.

24. The apparatus as claimed in claim 23, further comprising an Iur signaling transmitter/receiver unit for transmitting at least one of a radio link setup request message and a radio link addition message comprising the first channel configuration information and the second channel configuration information to a DRNC controlling the target cell as the UE moves to the target cell, for receiving from the DRNC at least one of a radio link setup response message and a radio link addition response message comprising the enable indicator information, which indicates whether or not the target cell supports the E-DCH, and setting up a bearer for uplink data communication with the DRNC.

* * * * *